US012743994B2

(12) United States Patent
Oh et al.

(10) Patent No.: US 12,743,994 B2
(45) Date of Patent: Sep. 22, 2026

(54) DISPLAY DEVICE AND ELECTRONIC DEVICE

(71) Applicant: Samsung Display Co., Ltd., Yongin-si (KR)

(72) Inventors: Kyong Hwan Oh, Yongin-si (KR); Won Kyu Kwak, Yongin-si (KR); Mi Na Kim, Yongin-si (KR); Ki Myeong Eom, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/208,084

(22) Filed: May 14, 2025

(65) Prior Publication Data

US 2025/0391339 A1 Dec. 25, 2025

(30) Foreign Application Priority Data

Jun. 21, 2024 (KR) ........................ 10-2024-0081055
Nov. 4, 2024 (KR) ........................ 10-2024-0154531

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2310/062* (2013.01); *G09G 2310/08* (2013.01); *G09G 2330/021* (2013.01)

(58) Field of Classification Search
CPC ............. G09G 3/32; G09G 2300/0819; G09G 2310/0267; G09G 2310/062; G09G 2310/08; G09G 2330/021; G09G 3/3233; G09G 3/3266
See application file for complete search history.

(56) References Cited

U.S. PATENT DOCUMENTS

| | | | | |
|---|---|---|---|---|
| 10,395,616 | B2 | 8/2019 | Koo et al. | |
| 10,510,293 | B2 * | 12/2019 | Jung | G09G 3/3258 |
| 11,610,538 | B2 | 3/2023 | Park et al. | |
| 11,749,158 | B2 | 9/2023 | Feng et al. | |
| 12,494,154 | B2 * | 12/2025 | Oh | G09G 3/2092 |
| 12,548,510 | B2 * | 2/2026 | Lim | G09G 3/3233 |

(Continued)

FOREIGN PATENT DOCUMENTS

| | | | |
|---|---|---|---|
| CN | 113516957 | A | 10/2021 |
| KR | 10-2248841 | B1 | 5/2021 |

(Continued)

*Primary Examiner* — Jeff Piziali

(74) *Attorney, Agent, or Firm* — Womble Bond Dickinson (US) LLP

(57) ABSTRACT

A display device includes: a display panel including a pixel connected to a first gate line, a second gate line, a third gate line, and a light emission control line; a gate driver; and a timing controller. The gate driver is to: output a first gate signal, a second gate signal, a third gate signal, and an emission control signal, each having a pulse, during an active period; and output the emission control signal having a pulse, while maintaining the first and second gate signals at a constant voltage, during a blank period. The timing controller is to: provide, to the gate driver during the active period, first to fourth clock signals that toggle between a logic high level and a logic low level; and maintain the first and second clock signals at a constant voltage during the blank period.

20 Claims, 19 Drawing Sheets

(56) References Cited

U.S. PATENT DOCUMENTS

| | | | | |
|---|---|---|---|---|
| 2019/0156732 | A1* | 5/2019 | Kong | G09G 3/3266 |
| 2021/0125559 | A1* | 4/2021 | Park | H10K 59/1213 |
| 2022/0139301 | A1* | 5/2022 | Kim | G09G 3/32 345/690 |
| 2022/0301484 | A1* | 9/2022 | In | G09G 3/2092 |
| 2023/0196982 | A1* | 6/2023 | Lee | G09G 3/32 345/204 |
| 2023/0230537 | A1* | 7/2023 | Park | G09G 3/32 345/214 |
| 2024/0161693 | A1* | 5/2024 | Cho | G09G 3/3266 |
| 2024/0161701 | A1* | 5/2024 | Kim | G09G 3/3266 |
| 2025/0148990 | A1* | 5/2025 | Kim | G09G 3/3233 |
| 2025/0316218 | A1* | 10/2025 | Song | G09G 3/32 |
| 2026/0057842 | A1* | 2/2026 | Moon | G09G 3/3266 |
| 2026/0073876 | A1* | 3/2026 | Lee | G09G 3/3266 |
| 2026/0087988 | A1* | 3/2026 | Kwon | G09G 3/3233 |

FOREIGN PATENT DOCUMENTS

| | | | |
|---|---|---|---|
| KR | 10-2022-0119239 | A | 8/2022 |
| KR | 10-2486445 | B1 | 1/2023 |
| WO | WO 2015/178698 | A1 | 11/2015 |

* cited by examiner

17: 13, 15

<ADDRESS SCAN>

<ADDRESS SCAN>

<SELF SCAN>

DISPLAY DEVICE AND ELECTRONIC DEVICE

CROSS-REFERENCE TO RELATED APPLICATION

The present application claims priority to and the benefit of Korean Patent Application Number 10-2024-0081055, filed on Jun. 21, 2024, and Korean Patent Application Number 10-2024-0154531, filed on Nov. 4, 2024, in the Korean Intellectual Property Office, the entire disclosures of all of which are incorporated by reference herein.

BACKGROUND

1. Field

Aspects of some embodiments of the present disclosure relate to a display device and an electronic device.

2. Description of the Related Art

A display device includes a data driver, a gate driver, and pixels. The data driver provides data signals to the pixels through data lines. The gate driver generates a gate signal using a clock signal provided from an external device, and sequentially provides the gate signal to the pixels through gate lines. Each of the pixels may record a corresponding data signal in response to the gate signal, and may emit light in response to the data signal.

The above information disclosed in this Background section is for enhancement of understanding of the background of the present disclosure, and therefore, it may contain information that does not constitute prior art.

SUMMARY

Embodiments of the present disclosure may be directed to a display device and an electronic device for reducing a power consumption, and preventing or substantially preventing a degradation of a display quality.

According to one or more embodiments of the present disclosure, a display device includes: a display panel including a pixel connected to a first gate line, a second gate line, a third gate line, and a light emission control line; a gate driver configured to provide a first gate signal to the first gate line in response to a first clock signal, a second gate signal to the second gate line in response to a second clock signal, a third gate signal to the third gate line in response to a third clock signal, and an emission control signal to the light emission control line in response to a fourth clock signal; and a timing controller configured to provide the first to fourth clock signals to the gate driver. The gate driver is configured to: output the first gate signal, the second gate signal, the third gate signal, and the emission control signal, each having a pulse, during an active period; and output the emission control signal having a pulse, while maintaining the first and second gate signals at a constant voltage, during a blank period. The timing controller is configured to: provide, to the gate driver during the active period, the first to fourth clock signals that toggle between a logic high level and a logic low level; and maintain the first and second clock signals at a constant voltage during the blank period.

In an embodiment, the timing controller may be configured to provide, to the gate driver during the blank period, the third and fourth clock signals that toggle.

In an embodiment, the gate driver may be configured to sequentially output the second gate signal, the first gate signal, and the third gate signal, while outputting the pulse of the emission control signal, during the active period. The pulse of the first gate signal may have the logic low level, the pulse of the second gate signal may have the logic high level, the pulse of the third gate signal may have the logic low level, and the pulse of the emission control signal may have the logic high level.

In an embodiment, the timing controller may be configured to maintain each of the first and second clock signals at the logic low level during the blank period.

In an embodiment, the timing controller may be configured to maintain the first clock signal and the second clock signal at different constant voltages from each other during the blank period.

In an embodiment, the timing controller may be configured to maintain the first clock signal at the logic high level and the second clock signal at the logic low level during the blank period.

In an embodiment, the pixel may include: a light emitting element; a first thin film transistor configured to control an amount of current provided to the light emitting element; a second thin film transistor connected between a data line and a first electrode of the first thin film transistor, and including a gate electrode connected to the first gate line; a third thin film transistor connected between a gate electrode of the first thin film transistor and a second electrode of the first thin film transistor, and including a gate electrode connected to the second gate line; a fourth thin film transistor connected between the gate electrode of the first thin film transistor and an initialization power, and including a gate connected to a fourth gate line; a fifth thin film transistor connected between a first power and the first electrode of the first thin film transistor, and including a gate electrode connected to the light emission control line; a sixth thin film transistor connected between the second electrode of the first thin film transistor and an anode electrode of the light emitting element, and including a gate electrode connected to the light emission control line; and a seventh thin film transistor connected to the anode electrode of the light emitting element, and including a gate electrode connected to the third gate line.

In an embodiment, the pixel may further include an eighth thin film transistor connected between the first electrode of the first thin film transistor and a bias power, and including a gate electrode connected to the third gate line. The gate driver may be configured to output the third gate signal having the pulse during the blank period.

In an embodiment, the gate driver may include: a first stage configured to output the first gate signal; and a second stage configured to output the second gate signal. The second stage may include a CMOS transistor.

In an embodiment, the second stage may include: a first transistor connected between a first node and an input line configured to receive a second start signal or a second previous gate signal, and including a gate electrode connected to a 22nd clock line; a second transistor connected between the input line and the first node, and including a gate electrode connected to a 21st clock line; a third transistor connected between a first gate power and a second node, and including a gate electrode connected to the first node; a fourth transistor connected between the second node and a second gate power, and including a gate electrode connected to the first node; a fifth transistor connected between the first gate power and the second gate line, and including a gate electrode connected to the second node; and a sixth transistor connected between the second gate line and the second gate power, and including a gate electrode connected to the second node. The 21st clock line may be configured to receive the second clock signal, and the 22nd clock line may be configured to receive a second inverting clock signal having a phase delayed by half a period from the second clock signal.

In an embodiment, each of the first, third, and fifth transistors may be a P type transistor, and each of the second, fourth, and sixth transistors may be an N type transistor.

In an embodiment, the second stage may include: a seventh transistor connected between the first node and a third node, and including a gate electrode connected to the second gate power; an eighth transistor connected between the second gate line and the second gate power, and including a gate electrode connected to the third node; a ninth transistor connected between the first gate power and a carry line, and including a gate electrode connected to the second node; and a tenth transistor connected between the carry line and the second gate power, and including a gate electrode connected to the second node.

In an embodiment, the gate driver may further include: a third stage configured to output the third gate signal; and an emission stage configured to output the emission control signal. The third stage may have a same circuit configuration as that of the first stage, the emission stage may have a same circuit configuration as that of the second stage, and the second stage may have a different circuit configuration from that of the first stage.

In an embodiment, the gate driver may be configured to maintain the second gate signal at the logic low level in response to a reset signal, and maintain the first gate signal at the logic high level regardless of the reset signal during the blank period.

In an embodiment, the reset signal may have a gate-off voltage during the active period, and a gate-on voltage during the blank period.

In an embodiment, the gate driver may include a second stage configured to output the second gate signal, and the second stage may include: a first transistor connected between a first node and an input line configured to receive a second start signal or a second previous gate signal, and including a gate electrode connected to a 22nd clock line; a second transistor connected between the input line and the first node, and including a gate electrode connected to a 21st clock line; a third transistor connected between a first gate power and a second node, and including a gate electrode connected to the first node; a fourth transistor connected between the second node and a second gate power, and including a gate electrode connected to the first node; a fifth transistor connected between the first gate power and the second gate line, and including a gate electrode connected to the second node; a sixth transistor connected between the second gate line and the second gate power, and including a gate electrode connected to the second node; and a reset transistor connected between the first node and the second gate power, and including a gate electrode configured to receive the reset signal. The 21st clock line may be configured to receive the second clock signal, and the 22nd clock line may be configured to receive a second inverting clock signal having a phase delayed by half a period from the second clock signal.

In an embodiment, the gate driver may include a first stage configured to output the first gate signal, and the first stage may include: a first transistor connected between a third control node and an input line configured to receive a first start signal or a first previous gate signal, and including a gate electrode connected to a 12th clock line; a second transistor connected between the third control node and a first control node, and including a gate electrode connected to a second gate power; a third transistor connected between the first gate line and a 11th clock line, and including a gate electrode connected to the first control node; and a first capacitor connected between the first gate line and the first control node. The 11th clock line may be configured to receive the first clock signal, and the 12th clock line may be configured to receive a first inverting clock signal having a phase delayed by half a period from the first clock signal.

In an embodiment, the first stage may include: a fourth transistor connected between a first gate power and the first gate line, and including a gate electrode connected to a second control node; a fifth transistor connected between the second control node and the 12th clock line, and including a gate electrode connected to the third control node; a sixth transistor connected between the second control node and the second gate power, and including a gate electrode connected to the 12th clock line; and a second capacitor connected between the first gate power and the second control node.

In an embodiment, each of the first to sixth transistors may include a silicon semiconductor.

According to one or more embodiments of the present disclosure, an electronic device includes: a processor configured to provide image data; and a display device configured to display an image based on the image data. The display device includes: a display panel including a pixel connected to a first gate line, a second gate line, a third gate line, and a light emission control line; a gate driver configured to provide a first gate signal to the first gate line in response to a first clock signal, a second gate signal to the second gate line in response to a second clock signal, a third gate signal to the third gate line in response to a third clock signal, and an emission control signal to the light emission control line in response to a fourth clock signal; and a timing controller configured to provide the first to fourth clock signals to the gate driver. The gate driver is configured to: output the first gate signal, the second gate signal, the third gate signal, and the emission control signal, each having a pulse, during an active period; and output the emission control signal having a pulse, while maintaining the first and second gate signals at a constant voltage, during a blank period. The timing controller is configured to: provide, to the gate driver during the active period, the first to fourth clock signals that toggle between a logic high level and a logic low level; and maintain the first and second clock signals during the blank period.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
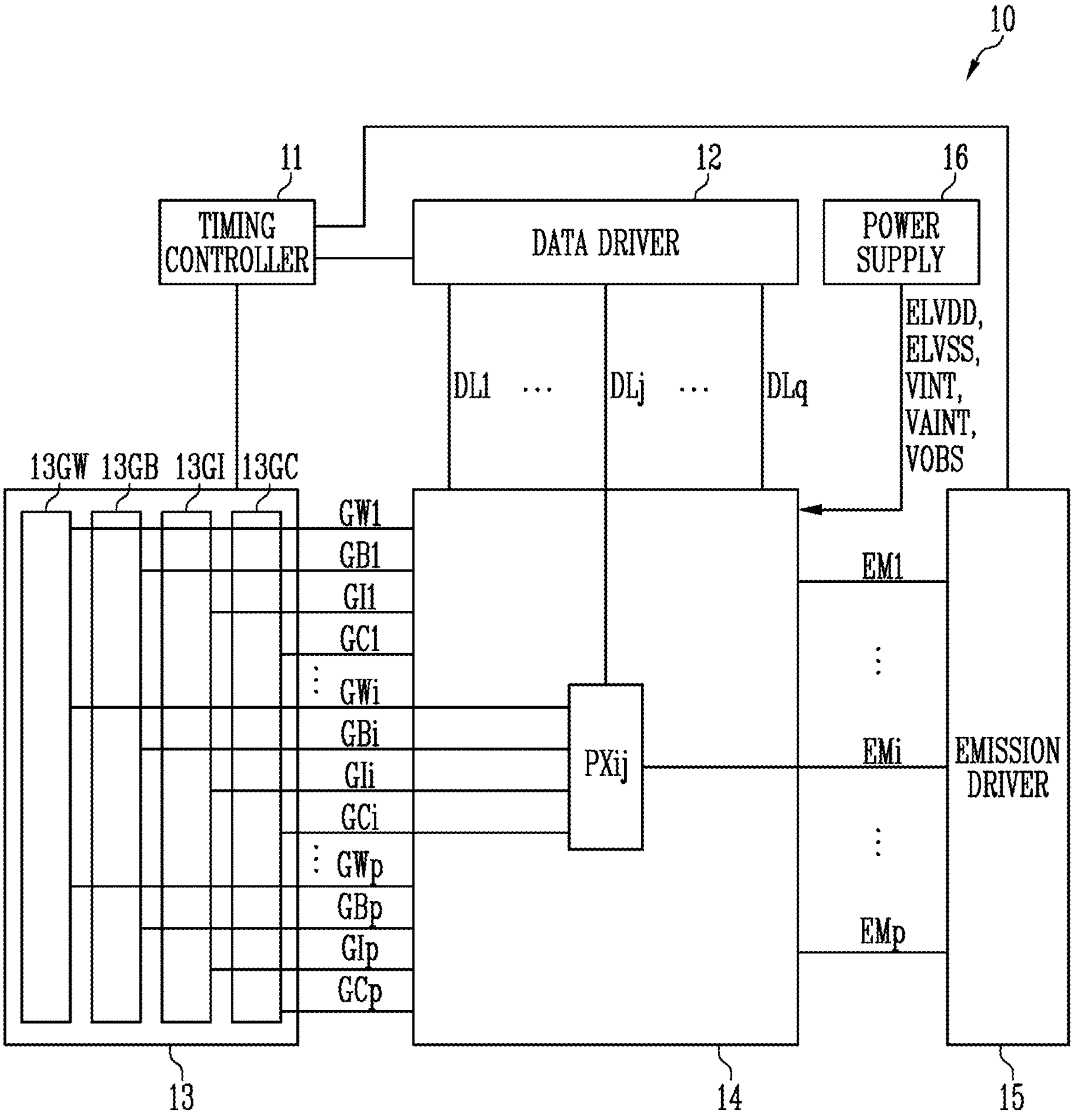
FIG. 1 is a diagram illustrating a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device 10 according to an embodiment.

Referring to FIG. 1, the display device 10 may include a timing controller 11, a data driver 12, a scan driver 13, a pixel part 14, an emission driver 15, and a power supply 16. The scan driver 13 and the emission driver 15 may constitute a gate driver 17.

The timing controller 11 may receive input image data for an input image (e.g., an input frame). The input image data may include grayscales (e.g., grayscale values or levels), and the grayscales may include a first color grayscale (e.g., a first color grayscale value or level), a second color grayscale (e.g., a second color grayscale value or level), and a third color grayscale (e.g., a third color grayscale value or level). The first color grayscale may be a grayscale for representing a first color, the second color grayscale may be a grayscale for representing a second color, and the third color grayscale may be a grayscale for representing a third color.

In addition, the timing controller 11 may receive a control signal for an image. The control signal may include a horizontal synchronization signal (Hsync), a vertical synchronization signal (Vsync), and a data enable signal. The vertical synchronization signal may include a plurality of pulses, and may indicate that a previous frame period ends and a current frame period begins based on a time point at which each of the pulses occurs. A spacing between adjacent pulses of the vertical synchronization signal may correspond to one frame period. The horizontal synchronization signal may include a plurality of pulses, and may indicate that a previous horizontal period ends and a new horizontal period begins based on a time point at which each of the pulses occurs. A spacing between adjacent pulses of the horizontal synchronization signal may correspond to one horizontal period. The data enable signal may have an enable level for horizontal periods (e.g., predetermined horizontal periods), and a disable level for other remaining periods. When the data enable signal is at the enable level, the data enable signal may indicate that color grayscales (e.g., color grayscale values or levels) are supplied during the corresponding horizontal periods.

The timing controller 11 may provide the data driver 12 with grayscales (e.g., grayscale values or levels), which are rendered or corrected to meet the specifications of the display device 10. In addition, the timing controller 11 may provide a clock signal, a scan start signal, and the like to the scan driver 13. The timing controller 11 may provide a clock signal, an emission stop signal, and the like to the emission driver 15.

The data driver 12 may generate data voltages to be provided to data lines DL1, . . . , DLj, . . . , and DLq by using grayscales (e.g., grayscale values or levels) and control signals, which are received from the timing controller 11. The data driver 12 may sample the grayscales using a clock signal, and may apply data voltages corresponding to the grayscales to the data lines in units of pixel rows. With regard to the data lines DL1, . . . , DLj, . . . , and DLq, q may be an integer greater than 2, and j may be an integer larger than 1 and smaller than q.

The scan driver 13 may include first, second, third, and fourth scan drivers 13GW, 13GC, 13GB, and 13GI. The first scan driver 13GW may provide first scan signals to first scan lines GW1, . . . , GWi, . . . , and GWp, where p may be an integer greater than 2 and i may be an integer greater than 1 and less than p. The second scan driver 13GC may provide fourth scan signals to second scan lines GC1, . . . , GCi, . . . , and GCp. The third scan driver 13GB may provide second scan signals to third scan lines GB1, . . . , GBi, . . . , and GBp. The fourth scan driver 13GI may provide third scan signals to fourth scan lines GI1, . . . , GIi, . . . , and GIp.

For example, the first scan driver 13GW may receive at least one scan clock signal and a scan start signal from the timing controller 11 to generate the first scan signals to be provided to the first scan lines GW1 to GWp. The first scan driver 13GW may sequentially provide the first scan signals having a turn-on level pulse to the first scan lines GW1 to GWp. For example, the first scan driver 13GW may be configured in the form of a shift register, and may generate the first scan signals by sequentially transmitting a scan start signal in a pulse form that has a turn-on level to a next scan stage in response to a control of a clock signal (e.g., a scan clock signal).

Each of the second scan driver 13GC, the third scan driver 13GB, and the fourth scan driver 13GI may be configured in the same or substantially the same manner (or a similar manner) to that of the first scan driver 13GW, and thus, redundant description thereof may not be repeated. According to an embodiment, at least some of the first, second, third, or fourth scan drivers 13GW, 13GC, 13GB, or 13GI may be integrated together. For example, two or more scan drivers may be integrated together when the scan drivers have the same polarity and width as each other. For example, referring to FIG. 5B, which will be described in more detail below, because a pulse of a turn-on level applied to the fourth scan line GIi at a time t4*a* may have the same polarity and width as those of a pulse of a turn-on level applied to the second scan line GCi at a time t5*a*, the fourth scan driver 13GI and the second scan driver 13GC may be integrally configured with each other.

The emission driver 15 (e.g., a light emission control driver) may receive at least one emission clock signal and an emission stop signal from the timing controller 11 to generate light-emitting signals (e.g., light emission control signals) to be provided to emission lines EM1, . . . , EMi, . . . , and EMp (e.g., light emission control lines). The emission driver 15 may sequentially provide the light-emitting signals having a pulse of a turn-off level to the emission lines EM1 to EMp. For example, the emission driver 15 may be configured in the form of a shift register, and may generate the light-emitting signals by sequentially transmitting the emission stop signal in a pulse form that has a turn-off level to a next emission stage in response to a control of the emission clock signal.

FIG. 1 shows the first scan lines GW1 to GWp, the second scan lines GC1 to GCp, the third scan lines GB1 to GBp, the fourth scan lines GI1 to GIp, and the emission lines EM1 to EMp. However, the present disclosure is not limited thereto, and in another embodiment, a number of at least one of the second scan lines, the third scan lines, the fourth scan lines, or the emission lines may be less than or equal to p/2. For example, two adjacent pixel rows may share one third scan line. Similarly, two adjacent pixel rows may share one fourth scan line, one second scan line, or one emission line. The same pixel row may refer to pixels that are connected to the same first scan line.

The pixel part 14 (e.g., a display panel) includes a plurality of pixels PX. A pixel PXij located at an i-th horizontal line and a j-th vertical line from among the pixels PX may be connected to a corresponding data line DLj, corresponding scan lines GWi, GCi, GBi, and GIi, and a corresponding emission line EMi. The pixel PXij may include a light emitting element to emit light based on a received data voltage.

The pixel part 14 may include first pixels that emit light of a first color, second pixels that emit light of second color, and third pixels that emit light of third color. The first color, the second color, and the third color may be different colors from each other. For example, the first color may be one of red, green, or blue, the second color may be another color from among red, green, or blue that is different from the first color, and the third color may be the remaining color from among red, green, or blue that is different from the first and second colors. In addition, instead of red, green, and blue, magenta, cyan, and yellow may be used as the first to third colors. Hereinafter, for convenience of illustration, the first color may be described in more detail as being red, the second color may be described in more detail as being green, and the third color may be described in more detail as being blue, but the present disclosure is not limited thereto.

The pixel part 14 may have various suitable arrangements, such as diamond shape (e.g., a diamond PENTILE® shape, PENTILE® being a duly registered trademark of Samsung Display Co., Ltd.), an RGB-Stripe shape, an S-stripe shape, a Real RGB shape, a normal RGBG shape (e.g., a normal PENTILE® shape), or the like.

The power supply 16 may provide voltages that are commonly supplied to the pixels of the pixel part 14. For example, the power supply 16 may provide a first power supply voltage ELVDD, a second power supply voltage ELVSS, an initialization voltage VINT, an anode initialization voltage VAINT, and a bias voltage VOBS. For example, the power supply 16 may be a power management integrated circuit (PMIC). For example, the power supply 16 may include a plurality of DC-DC converters.

According to an embodiment, the timing controller 11 and the data driver 12 may be configured together as one integrated circuit. In another embodiment, the timing controller 11, the data driver 12, and the power supply 16 may be configured together as one integrated circuit. In another embodiment, the timing controller 11, the data driver 12, the power supply 16, the scan driver 13, and the emission driver 15 may be configured together as one integrated circuit. However, the present disclosure is not limited thereto, and whether or not the components are incorporated together or are separate components may be variously determined as needed or desired depending on products.

Figure 2:
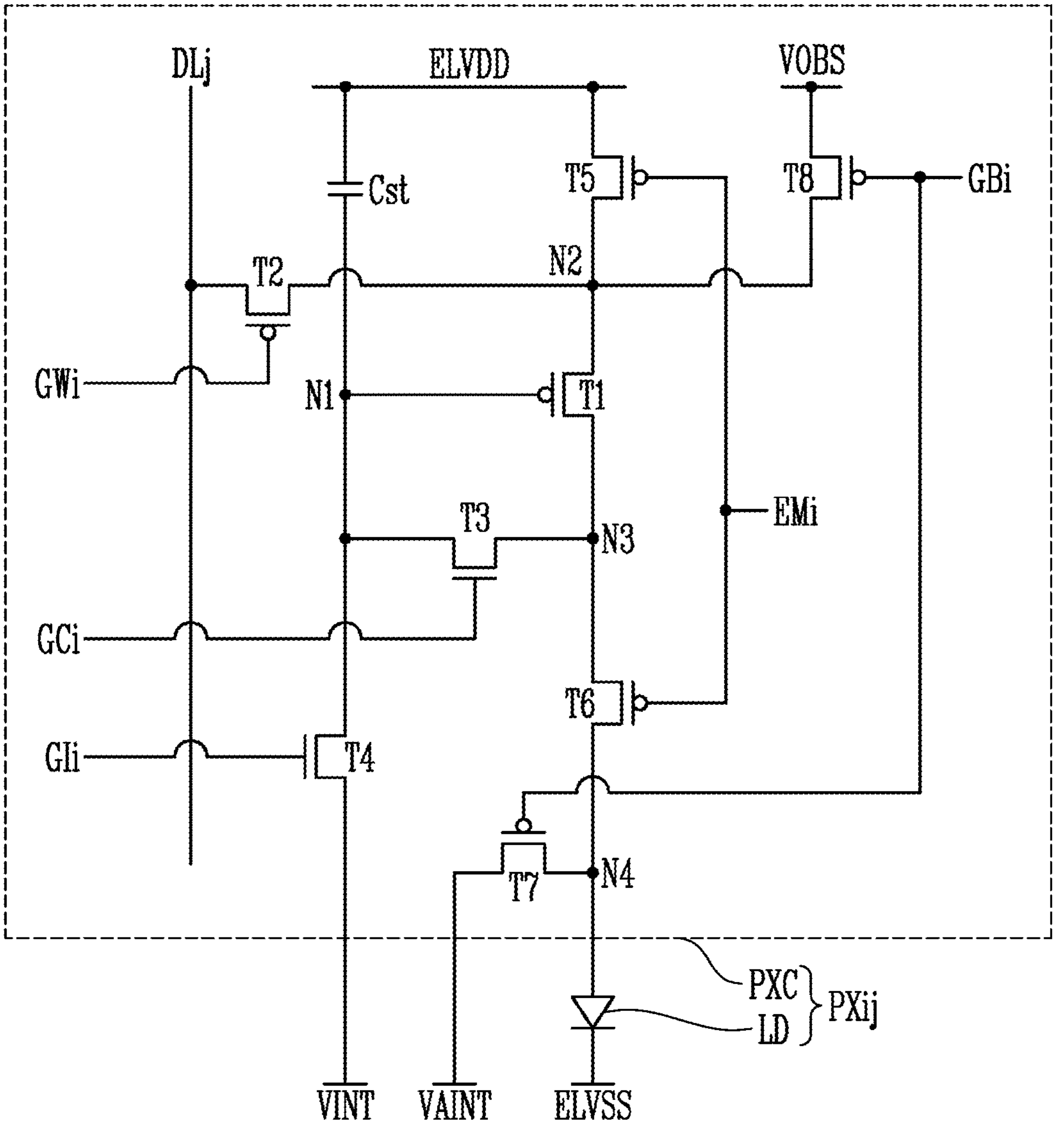
FIG. 2 is a diagram illustrating an embodiment of a pixel included in the display device of FIG. 1.

FIG. 2 is a diagram illustrating an embodiment of the pixel PXij included in the display device 10 of FIG. 1.

Referring to FIG. 2, the pixel PXij may include a pixel circuit PXC and a light emitting element LD. The pixel circuit PXC may include thin film transistors T1, T2, T3, T4, T5, T6, T7, and T8 (e.g., transistors), and a storage capacitor Cst.

The pixel PXij may be located in an i-th pixel row and a j-th pixel column. The pixel PXij may be a first pixel for representing the first color. The second pixel for representing the second color and the third pixel for representing the third color may have the same or substantially the same configuration as that of the first pixel, and thus, redundant description thereof may not be repeated.

P-type transistors may be polysilicon semiconductor transistors. A channel of an active layer of a polysilicon semiconductor transistor may include a polysilicon semiconductor. For example, the polysilicon semiconductor transistor may be a low temperature poly-silicon (LTPS) thin film transistor. Accordingly, polysilicon semiconductor transistors may have high electron mobility and fast driving characteristics.

N-type transistors may be oxide semiconductor transistors. A channel of an active layer of an oxide semiconductor transistor may include an oxide semiconductor. For example, the oxide semiconductor transistor may be a low temperature polycrystalline oxide (LTPO) thin film transistor. Oxide semiconductor transistors may have lower charge mobility than that of polysilicon semiconductor transistors. Thus, the oxide semiconductor transistors may have a smaller amount of a leakage current that may occur in a turn-off state than that of the polysilicon semiconductor transistors.

A gate electrode of a first thin film transistor T1 may be connected to a first node N1. A first electrode of the first thin film transistor T1 may be connected to a second node N2, and a second electrode thereof may be connected to a third node N3. The first thin film transistor T1 may be a driving transistor. The first thin film transistor T1 may be a P-type transistor.

A second thin film transistor T2 may have a gate electrode connected to the first scan line GWi, a first electrode connected to the data line DLj, and a second electrode connected to the second node N2. The second thin film transistor T2 may be a switching transistor. The second thin film transistor T2 may be a P-type transistor.

The first scan driver 13GW may provide a first scan signal of a turn-on level that determines a time at which the pixel PXij receives a data voltage. For example, the second thin film transistor T2 that receives a first scan signal of a turn-on level may be turned on, and the second thin film transistor T2 may apply a data voltage applied to the data line DLj to the second node N2.

A third thin film transistor T3 may have a gate electrode connected to the second scan line GCi, a first electrode connected to the first node N1, and a second electrode connected to the third node N3. The third thin film transistor T3 may be a diode-connected transistor. In other words, the third thin film transistor T3 may be turned on to diode-connect the first thin film transistor T1. The third thin film transistor T3 may be an N-type transistor.

A gate electrode of a fourth thin film transistor T4 may be connected to the fourth scan line GIi, a first electrode may be connected to the first node N1, and a second electrode may receive the initialization voltage VINT (e.g., an initialization power supply). The fourth thin film transistor T4 may be a gate initialization transistor. The fourth thin film transistor T4 may be an N-type transistor.

A gate electrode of a fifth thin film transistor T5 may be connected to the emission line EMi, a first electrode may receive the first power supply voltage ELVDD (e.g., the first power supply), and the second electrode may be connected to the second node N2. The fifth thin film transistor T5 may be a first emission control transistor. The fifth thin film transistor T5 may be a P-type transistor.

A sixth thin film transistor T6 may include a gate electrode connected to the emission line EMi, a first electrode connected to the third node N3, and a second electrode connected with a fourth node N4. The sixth thin film transistor T6 may be a second emission control transistor. The sixth thin film transistor T6 may be a P-type transistor.

A gate electrode of a seventh thin film transistor T7 may be connected to the third scan line GBi, a first electrode may receive the anode initialization voltage VAINT (e.g., an anode initialization power), and a second electrode may be connected to the fourth node N4. The seventh thin film transistor T7 may be an anode initialization transistor. The seventh thin film transistor T7 may be a P-type transistor. A magnitude of the anode initialization voltage VAINT may be different from that of the initialization voltage VINT.

The anode initialization voltage VAINT may be different (e.g., may be set differently) depending on the kind of the light emitting element LD. Depending on the kind of light emitting element LD, an emission start time may vary, and color distortion may occur due to the difference in the emission start time. For example, the anode initialization voltage VAINT for the light emitting element LD of the first color, the anode initialization voltage VAINT for the light emitting element LD of the second color, and the anode initialization voltage VAINT for the light emitting element LD of the third color may have different magnitudes (e.g., may be set to have different magnitudes) from each other. In another embodiment, the anode initialization voltages VAINT for the light emitting elements LD of two colors may be the same (e.g., may be set to be the same) as each other, whereas the anode initialization voltage VAINT for the light emitting element LD of the other remaining color may be different (e.g., may be set differently) from those of the light emitting elements LD of the two colors. In another embodiment, the same anode initialization voltages VAINT may be used (e.g., may be set) for all of the light emitting elements LD. As a result, a color distortion may be prevented or substantially prevented by adjusting the difference in the emission time for the light emitting elements LD for the respective colors.

The third scan driver 13GB may provide the second scan signal of a turn-on level that determines a time for initializing an anode voltage of the light emitting element LD. For example, the seventh thin film transistor T7 that receives the second scan signal of the turn-on level may be turned on, and the anode initialization voltage VAINT may be applied to an anode of the light emitting element LD, so that the anode voltage of the light emitting element LD may be initialized to the anode initialization voltage VAINT.

An eighth thin film transistor T8 may include a gate electrode connected to the third scan line GBi, a first electrode that may receive a bias voltage VOBS (e.g., a bias power), and a second electrode connected to the second node N2. The eighth thin film transistor T8 may be a bias transistor. The eighth thin film transistor T8 may be a P-type transistor.

The storage capacitor Cst may include a first electrode that may receive the first power supply voltage ELVDD, and a second electrode connected to the first node N1.

The light emitting element LD may include the anode connected to the fourth node N4, and a cathode that may receive the second power supply voltage ELVSS (e.g., a second power). The light emitting element LD may emit light of one of the first color, the second color, or the third color. The light emitting element LD may be a light emitting diode. The light emitting element LD may be configured as an organic light emitting diode, an inorganic light emitting diode, a quantum dot/well light emitting diode, or the like. In the present embodiment, one light emitting element LD may be provided in each pixel, but the present disclosure is not limited thereto, and in other embodiments, a plurality of light emitting elements may be provided in each pixel. The plurality of light emitting elements may be connected to each other in series, in parallel, in series-parallel, or the like.

Figure 3:
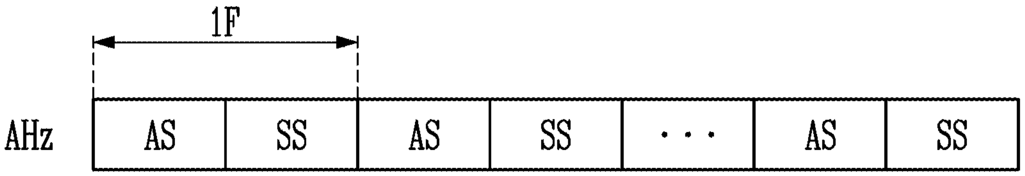
FIGS. 3 and 4 are diagrams illustrating a display frequency change according to an embodiment.
Figure 4:
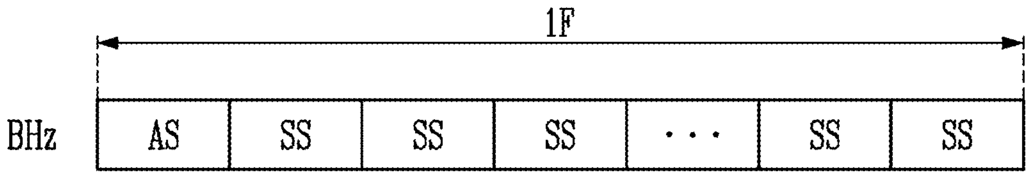

FIGS. 3 and 4 are diagrams illustrating a display frequency change according to an embodiment.

Referring to FIGS. 1 to 4, the display device 10 may support a variable refresh rate (VRR). A refresh rate may be a frequency at which a data voltage is written into the pixel PXij, and may also be referred to as a screen scan rate and a screen playback rate. The refresh rate may indicate a number of image frames that are played (e.g., that are displayed) for one second.

For example, the pixel part 14 may display an image at a first frequency AHz in a first mode as shown in FIG. 3, and may display an image at a second frequency BHz smaller than the first frequency AHz in a second mode as shown in FIG. 4.

For example, in the first mode, each frame period 1F may include one address scan period AS and one self-scan period SS per pixel PXij. For example, in the second mode, each frame period 1F may include one address scan period AS and a plurality of self-scan periods SS per pixel PXij. As the second frequency BHz decreases, the number of self-scan periods SS included in the frame period 1F may increase. As another example, each frame period 1F in a third mode may include only one address scan period AS without any self-scan period SS for each pixel PXij.

The address scan period AS is a period in which a data voltage is written into the pixel PXij. The address scan period AS may be referred to as a data programming period in which the data voltage is received from the data line DLj.

The self-scan period SS is a period in which the data voltage is not written into the pixel PXij. During an emission period of the self-scan period SS, the pixel PXij may emit light using the data voltage written in the address scan period AS. A length of the self-scan period SS may be the same or substantially the same as that of the address scan period AS.

Figure 5A:
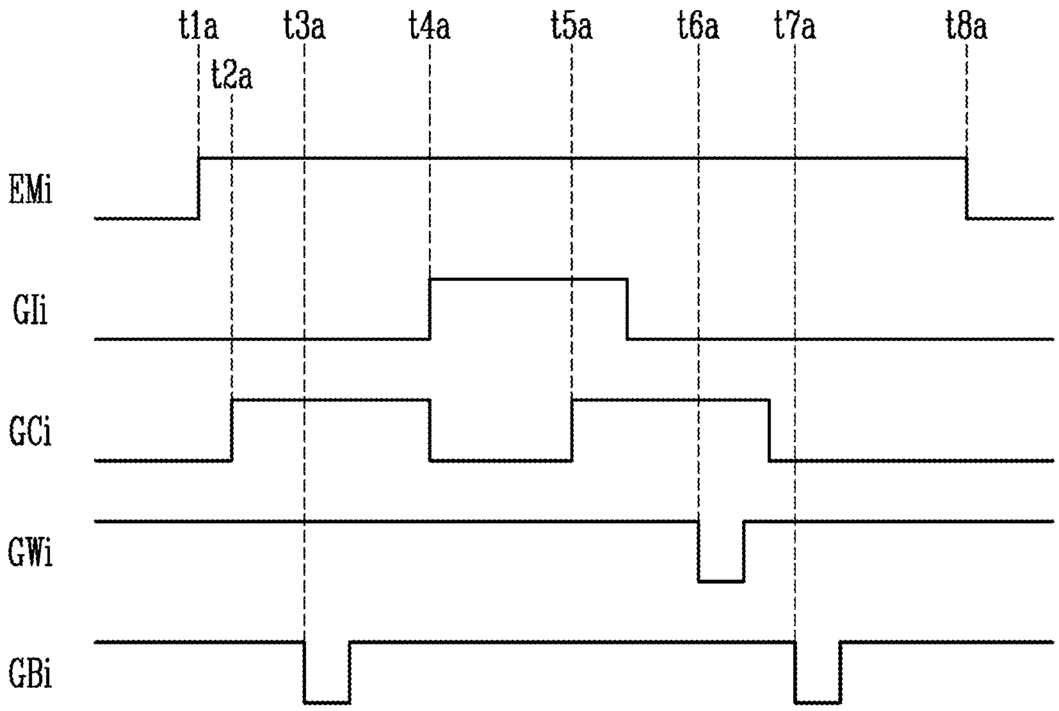
FIGS. 5A and 5B are diagrams illustrating an address scan period according to some embodiments.
Figure 5B:
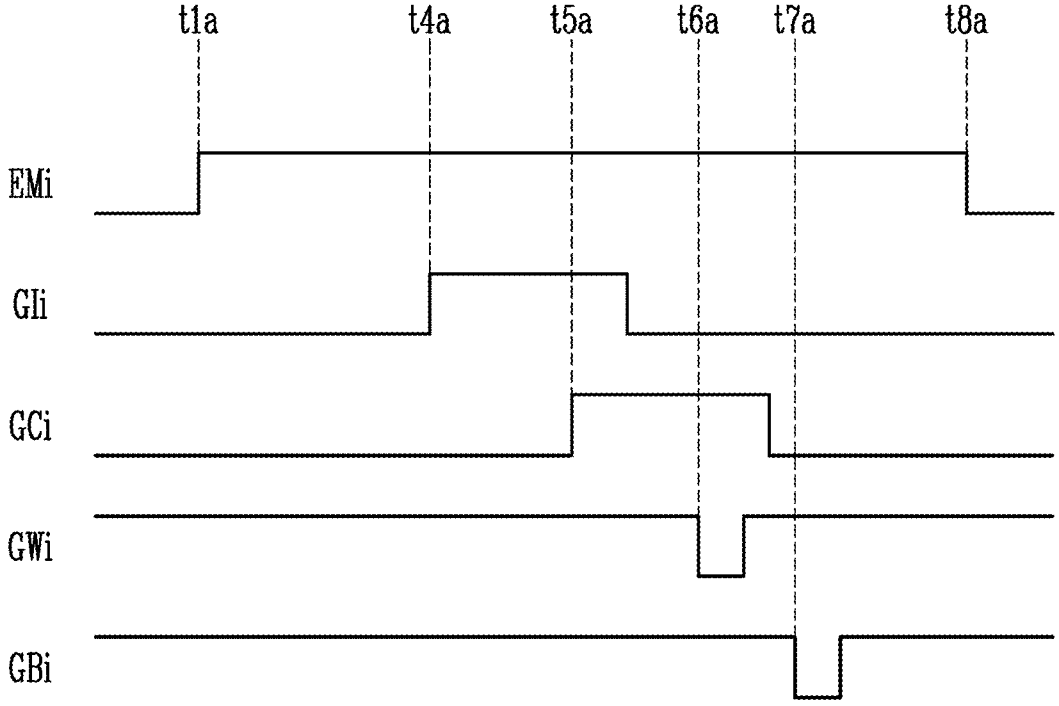

FIGS. 5A and 5B are diagrams illustrating an address scan period according to some embodiments.

Referring to FIGS. 2 and 5A, at a time t1*a*, a light-emitting signal (e.g., an emission control signal) of a turn-off level (e.g., a high level) may be applied to the emission line EMi, so that the fifth thin film transistor T5 and the sixth thin film transistor T6 are turned off, and the pixel PXij is in a non-emission state.

At a time t2a, a second scan signal of a turn-on level (e.g., a high level) is applied to the second scan line GCi, so that the third thin film transistor T3 is turned on. Therefore, the first thin film transistor T1 may be in a diode-connected state in which a drain electrode thereof and a gate electrode thereof are connected to each other by the turned-on third thin film transistor T3.

At a time t3a, a third scan signal of a turn-on level (e.g., a low level) is applied to the third scan line GBi to thereby turn on the seventh thin film transistor T7 and the eighth thin film transistor T8. As the seventh thin film transistor T7 is turned on, the anode initialization voltage VAINT is applied to the anode of the light emitting element LD, and the light emitting element LD may be initialized with a charge amount corresponding to a voltage difference between the anode initialization voltage VAINT and the second power supply voltage ELVSS. In addition, as the eighth thin film transistor T8 is turned on, a voltage of the second node N2 may have (e.g., may be set to) the bias voltage VOBS.

At a time t4a, a fourth scan signal of a turn-on level (e.g., a high level) is applied to the fourth scan line GIi to thereby turn on the fourth thin film transistor T4. Accordingly, the initialization voltage VINT is applied to the first node N1. The initialization voltage VINT may be low enough to on-bias the first thin film transistor T1.

At a time t5a, a second scan signal of a turn-on level (e.g., a high level) is applied to the second scan line GCi to thereby turn on the third thin film transistor T3. Therefore, the first thin film transistor T1 may be in a diode-connected state in which a drain electrode thereof and a gate electrode thereof are connected to each other.

At a time t6a, a first scan signal of a turn-on level (e.g., a low level) is applied to the first scan line GWi to thereby turn on the second thin film transistor T2. Therefore, the data voltage of the data line DLj may be applied to the first node N1 through the second thin film transistor T2, the first thin film transistor T1, and the third thin film transistor T3, which are in the turn-on state. The voltage of the first node N1 may be a compensation voltage obtained by subtracting a threshold voltage of the first thin film transistor T1 from the data voltage. The storage capacitor Cst may maintain or substantially maintain a difference between the first power supply voltage ELVDD and the compensation voltage.

At a time t7a, a third scan signal of a turn-on level (e.g., a low level) is applied to the third scan line GBi to thereby turn on the seventh thin film transistor T7 and the eighth thin film transistor T8. As the seventh thin film transistor T7 is turned on, the anode initialization voltage VAINT is applied to the anode of the light emitting element LD, and the light emitting element LD may be initialized with a charge amount corresponding to a voltage difference between the anode initialization voltage VAINT and the second power supply voltage ELVSS. Accordingly, the low grayscale (e.g., the low grayscale value or level) representation of the light emitting element LD may be facilitated.

In addition, as the eighth thin film transistor T8 is turned on, the voltage of the second node N2 may have (e.g., may be set to) the bias voltage VOBS. Accordingly, because the bias voltage VOBS is applied to the source electrode of the first thin film transistor T1, a hysteresis phenomenon may be prevented or substantially prevented, and an on-bias state may be ensured.

At a time t8a, a light-emitting signal of a turn-on level (e.g., a low level) is applied to the emission line EMi to thereby turn on the fifth thin film transistor T5 and the sixth thin film transistor T6. Accordingly, a path of a driving current may be formed, such that the driving current may flow from the first power supply voltage ELVDD to the second power supply voltage ELVSS via the fifth thin film transistor T5, the first thin film transistor T1, the sixth thin film transistor T6, and the light emitting element LD.

The amount of the driving current may be controlled according to a voltage that is maintained or substantially maintained in the storage capacitor Cst. The light emitting element LD may emit light at a luminance corresponding to the amount of the driving current. The light emitting element LD may emit light until a light-emitting signal of a turn-off level is applied to the emission line EMi.

As described above with reference to FIG. 5A, a scan signal may be applied twice to each of the second scan line GCi and the third scan line GBi, but the present disclosure is not limited thereto. Referring to FIG. 5B, for example, the fourth scan signal may be applied once to the second scan line GCi at the time t5a, and the second scan signal may be applied once to the third scan line GBi at the time t7a.

Figure 6:
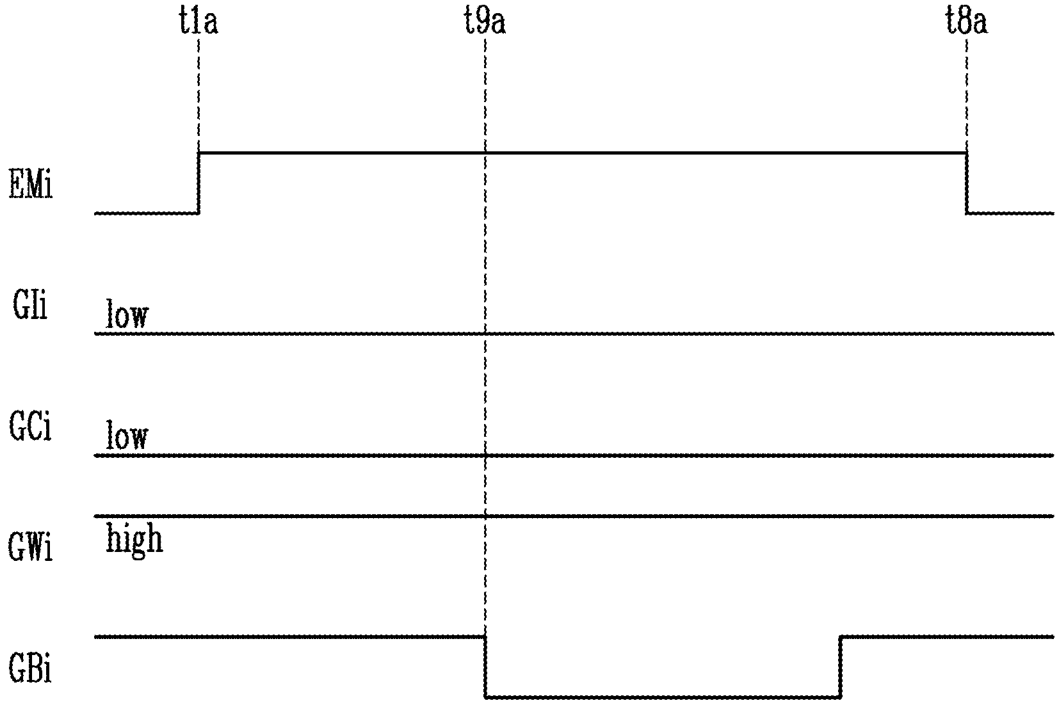
FIG. 6 is a diagram illustrating a self-scan period according to an embodiment.

FIG. 6 is a diagram illustrating a self-scan period according to an embodiment.

Referring to FIGS. 2 and 6, at a time t1a, the light-emitting signal of the turn-off level (e.g., a high level) is applied to the emission line EMi, so that the fifth thin film transistor T5 and the sixth thin film transistor T6 are turned off, and the pixel PXij is in a non-light emitting state.

During a period t1a to t8a, the scan signals of the turn-off level may be maintained in the first scan line GWi, the fourth scan line GIi, and the second scan line GCi. Therefore, the voltage of the first node N1 may remain unchanged.

At a time t9a, a scan signal of a turn-on level (e.g., a low level) is applied to the third scan line GBi to thereby turn on the seventh thin film transistor T7 and the eighth thin film transistor T8. As the seventh thin film transistor T7 is turned on, the anode initialization voltage VAINT is applied to the anode of the light emitting element LD, and the light emitting element LD may be initialized with a charge amount corresponding to a voltage difference between the anode initialization voltage VAINT and the second power supply voltage ELVSS. Accordingly, the low grayscale representation of the light emitting element LD may be facilitated.

In addition, as the eighth thin film transistor T8 is turned on, the voltage of the second node N2 may have (e.g., may be set to) the bias voltage VOBS. Accordingly, because the bias voltage VOBS is applied to the source electrode of the first thin film transistor T1, a hysteresis phenomenon may be prevented or substantially prevented, and an on-bias state may be ensured.

At the time t8a, a light-emitting signal of a turn-on level (e.g., a low level) is applied to the emission line EMi to thereby turn on the fifth thin film transistor T5 and the sixth thin film transistor T6. Accordingly, a path of a driving current may be formed, such that the driving current may flow from the first power supply voltage ELVDD to the second power supply voltage ELVSS via the fifth thin film transistor T5, the first thin film transistor T1, the sixth thin film transistor T6, and the light emitting element LD.

The amount of the driving current may be controlled according to the voltage maintained or substantially maintained in the storage capacitor Cst. Because the voltage of the first node N1, which is recorded during the address scan period AS, is maintained or substantially maintained during the self-scan period SS, the luminance of the pixel PXij during the self-scan period SS may be the same or substantially the same as that of the pixel PXij during the address scan period AS.

Figure 7:
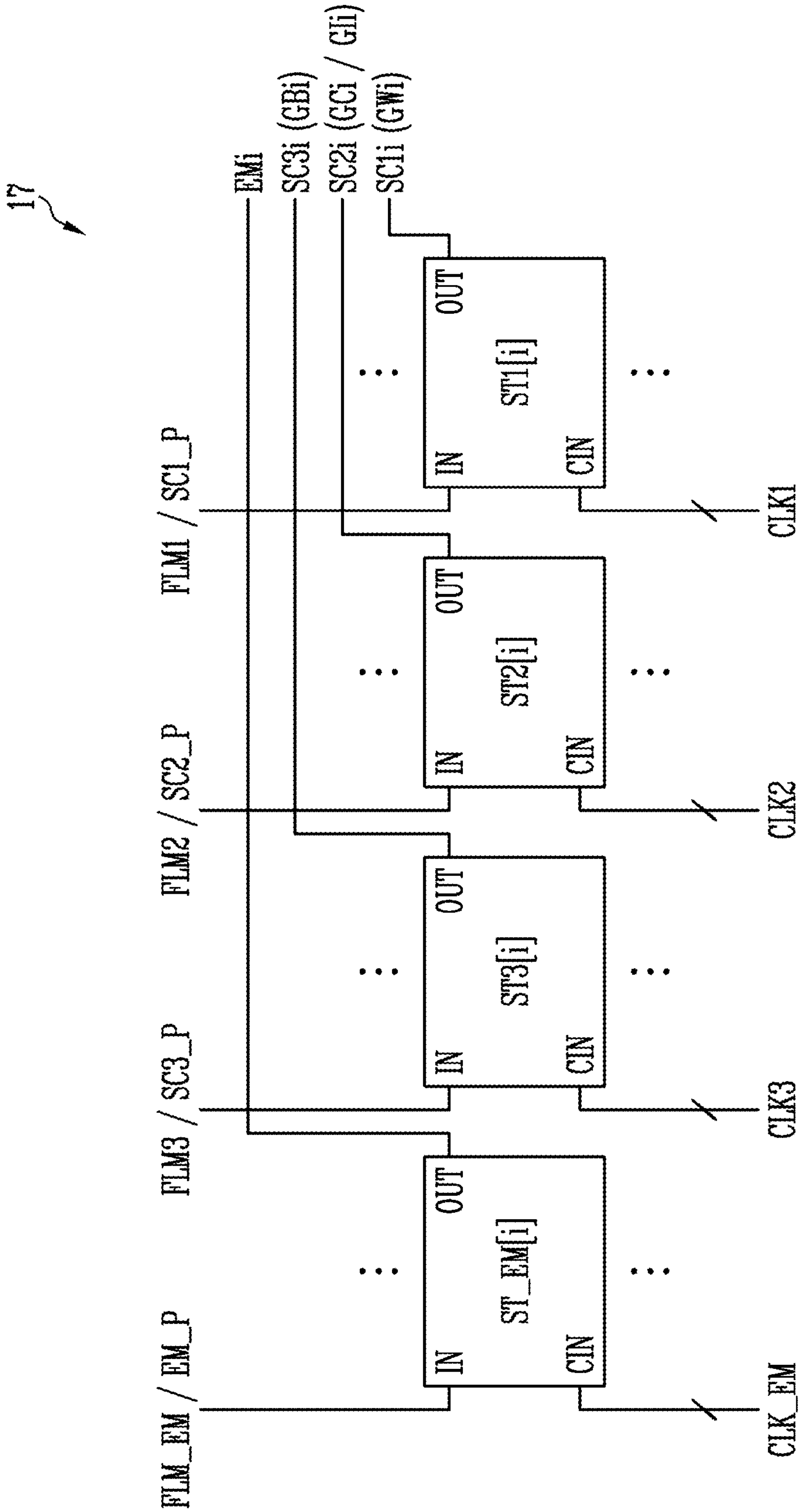
FIG. 7 is a diagram illustrating an embodiment of a gate driver included in the display device of FIG. 1.

FIG. 7 is a diagram illustrating an embodiment of the gate driver 17 included in the display device 10 of FIG. 1. FIG. 7 shows some of the configuration of the gate driver 17 connected to the i-th horizontal line. Pixels that are connected to the same gate line (and the same emission line) may be classified in one (e.g., the same) horizontal line (e.g., a pixel row).

Referring to FIGS. 1 and 7, the gate driver 17 may include a first stage ST1[*i*], a second stage ST2[*i*], a third stage ST3[*i*], and an emission stage ST_EM[i] (e.g., a fourth stage). The first stage ST1[*i*], the second stage ST2[*i*], the third stage ST3[*i*], and the emission stage ST_EM[i] may be provided per horizontal line. As used herein, the term 'stage' may refer to a unit circuit that outputs one gate signal or one light-emitting signal.

Figure 10:
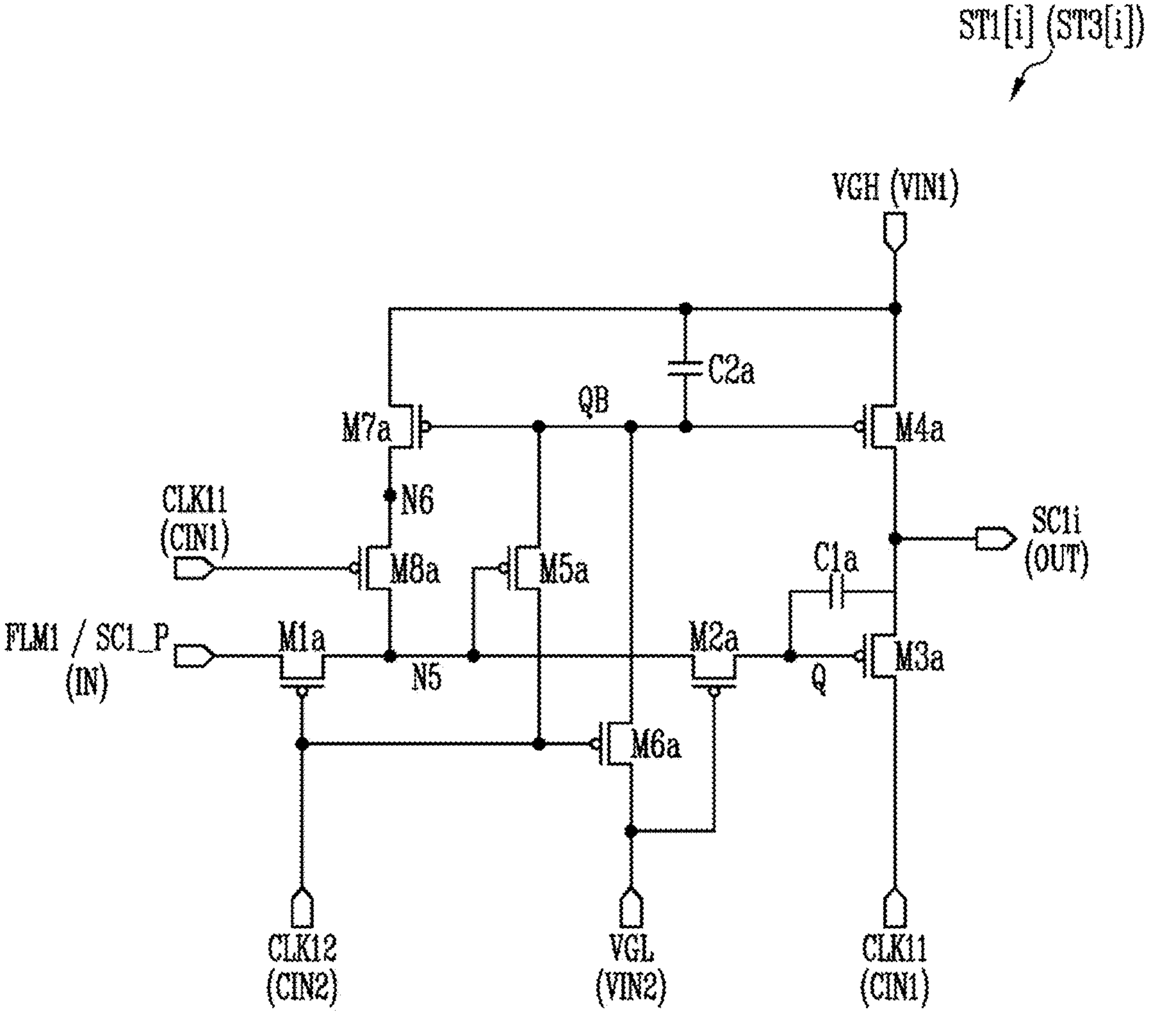
FIG. 10 is a schematic diagram of an equivalent circuit of an embodiment of a first stage included in the gate driver of FIG. 7.

An input terminal IN (e.g., an input line) of the first stage ST1[*i*] receives a first start signal FLM1, or an output SC1_P of a first previous stage located before the first stage ST1[*i*]. A clock input terminal CIN (e.g., a clock line) of the first stage ST1[*i*] receives a first clock signal CLK1, and an output terminal OUT of the first stage ST1[*i*] may be connected to a first gate line SC1*i*. For example, the first gate line SC1*i* may be a first scan line GWi. The first stage ST1[*i*] may be included in the first scan driver 13GW of FIG. 1. According to an embodiment, the first stage ST1[*i*] may include a P-type transistor (e.g., may include only a P-type transistor) as shown in FIG. 10.

Figure 12:
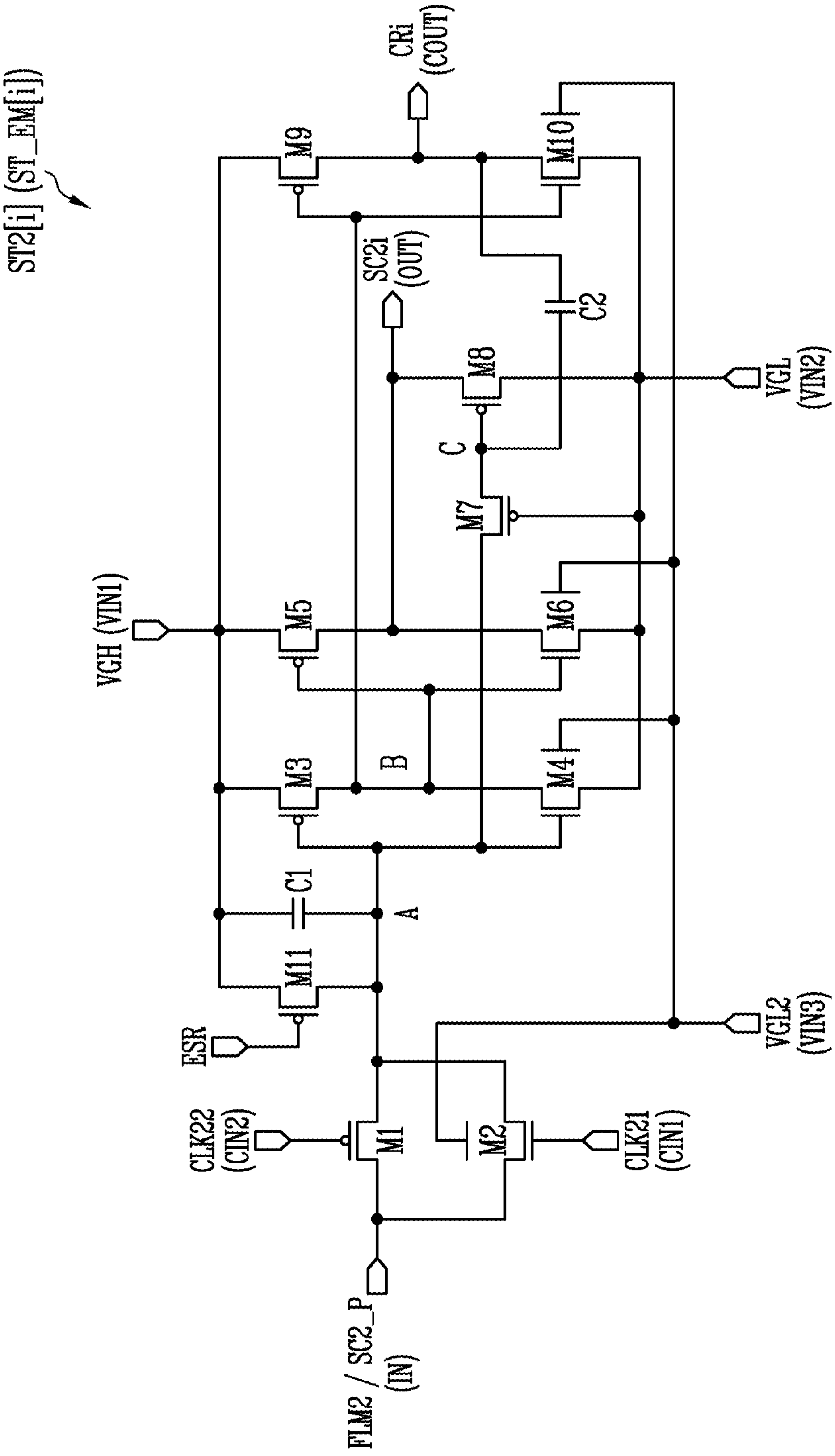
FIG. 12 is a schematic diagram of an equivalent circuit of an embodiment of a second stage included in the gate driver of FIG. 7.

The input terminal IN (e.g., the input line) of the second stage ST2[*i*] may receive a second start signal FLM2, or an output SC2_P of a second previous stage located before the second stage ST2[*i*]. The clock input terminal CIN (e.g., the clock line) of the second stage ST2[*i*] may receive a second clock signal CLK2. The output terminal OUT of the second stage ST2[*i*] may be connected to a second gate line SC2*i*. For example, the second gate line SC2*i* may be a second scan line GCi and/or a fourth scan line GIi. The second stage ST2[*i*] may be included in the second scan driver 13GC and/or the fourth scan driver 13GI of FIG. 1. According to an embodiment, the second stage ST2[*i*] may include a complementary metal-oxide-semiconductor (CMOS) transistor as shown in FIG. 12.

The input terminal IN (e.g., the input line) of the third stage ST3[*i*] may receive a third start signal FLM3, or an output SC3_P of a third previous stage located before the third stage ST3[*i*]. The clock input terminal CIN (e.g., the clock line) of the third stage ST3[*i*] may receive a third clock signal CLK3. The output terminal OUT of the third stage ST3[*i*] may be connected to a third gate line SC3*i*. For example, the third gate line SC3*i* may be the third scan line GBi. The third stage ST3[*i*] may be included in the third scan driver 13GB of FIG. 1.

The input terminal IN (e.g., the input line) of the emission stage ST_EM[i] may receive an emission start signal FLM_EM, or an output EM_P of a previous emission stage located before the emission stage ST_EM[i]. The clock input terminal CIN (e.g., the clock line) of the emission stage ST_EM[i] may receive an emission clock signal CLK_EM, and the output terminal OUT of the emission stage ST_EM [i] may be connected to the emission line EMi. The emission stage ST_EM[i] may be included in the emission driver 15 of FIG. 1.

Figure 8A:
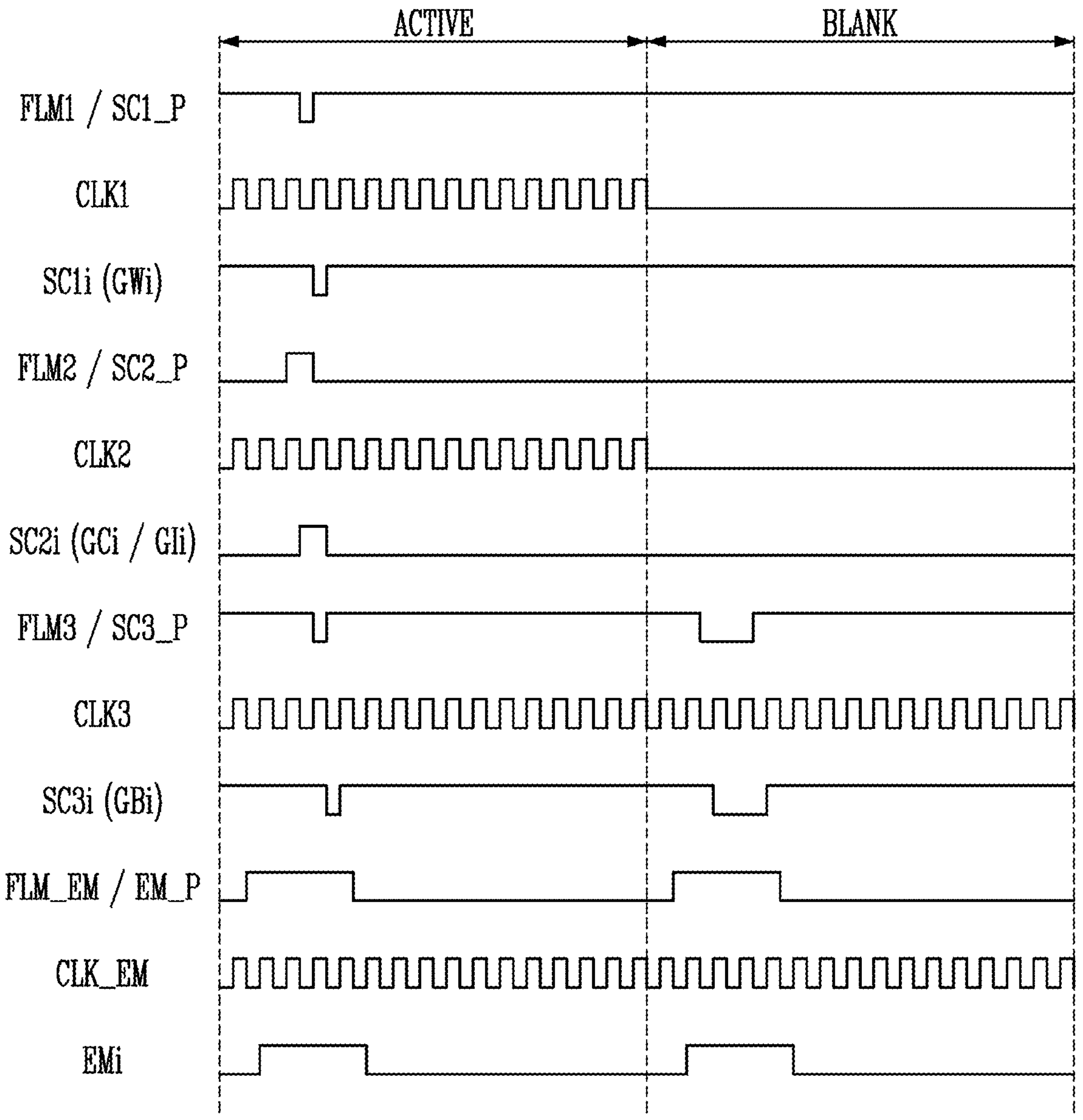
FIGS. 8A and 8B are waveform diagrams illustrating operations of the gate driver of FIG. 7 according to some embodiments.
Figure 8B:
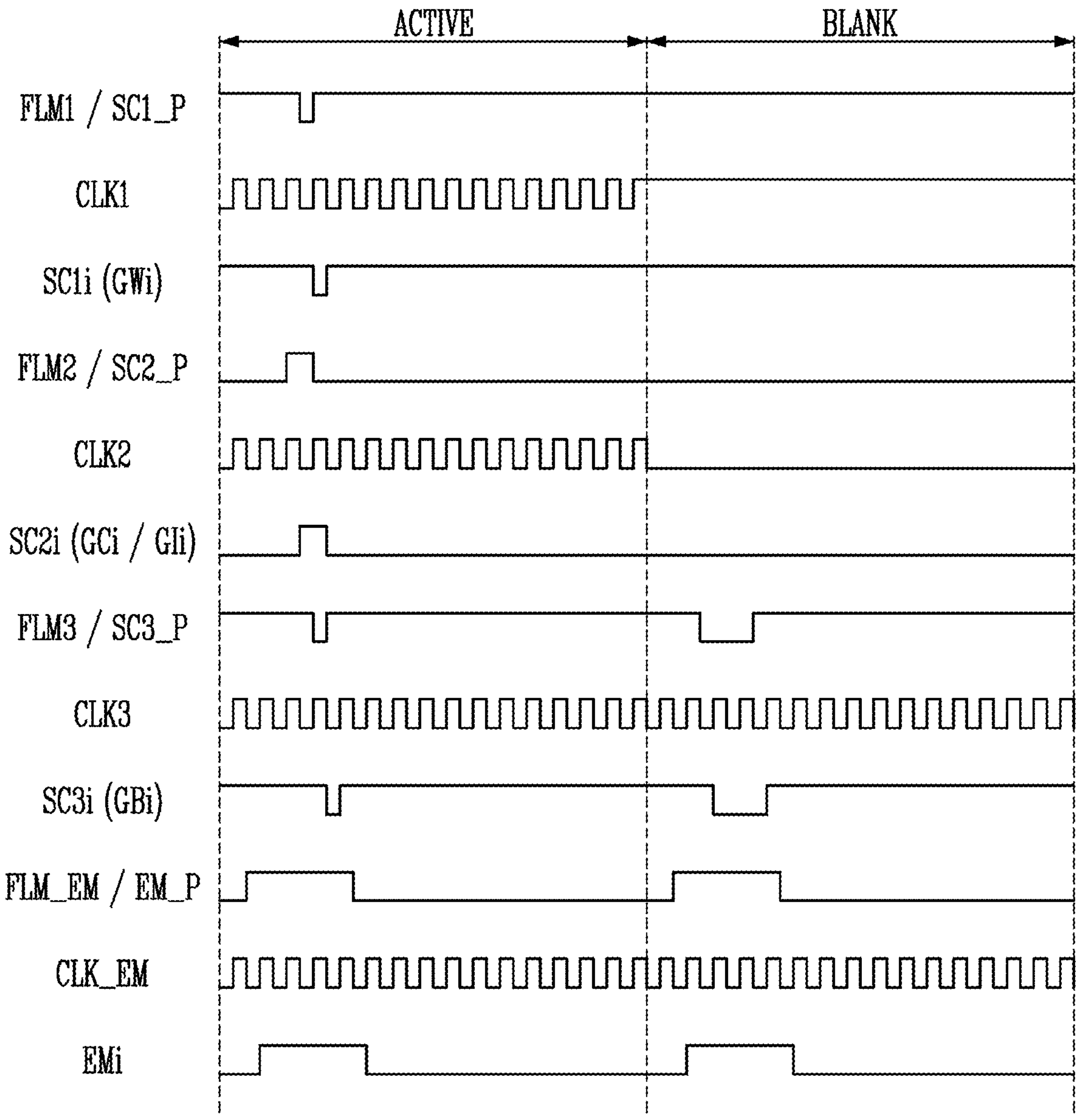

FIGS. 8A and 8B are waveform diagrams illustrating operations of the gate driver 17 of FIG. 7 according to some embodiments.

Referring to FIGS. 5B, 6, 7, and 8A, the first stage ST1[*i*] may provide a first gate signal to the first gate line SC1*i* in response to (e.g., in synchronization with) the first clock signal CLK1. For example, the first stage ST1[*i*] may shift the first start signal FLM1 or the output SC1_P of the first previous stage by using the first clock signal CLK1 to provide the first gate signal to the first gate line SC1*i*.

The second stage ST2[*i*] may provide a second gate signal to the second gate line SC2*i* in response to the second clock signal CLK2. For example, the second stage ST2[*i*] may shift the second start signal FLM2 or the output SC2_P of the second previous stage by using the second clock signal CLK2 to provide the second gate signal to the second gate line SC2*i*.

The third stage ST3[*i*] may provide a third gate signal to the third gate line SC3*i* in response to the third clock signal CLK3. For example, the third stage ST3[*i*] may shift the third start signal FLM3 or the output SC3_P of the third previous stage by using the third clock signal CLK3 to provide the third gate signal to the third gate line SC3*i*.

The emission stage ST_EM[i] may provide a light-emitting signal to the emission line EMi in response to the emission clock signal CLK_EM (e.g., a fourth clock signal CLK4). For example, the emission stage ST_EM[i] may shift the emission start signal FLM_EM or the output EM_P of the previous emission stage by using the emission clock signal CLK_EM to provide the light-emitting signal to the emission line EMi.

An active period ACTIVE may correspond to the address scan period AS described above with reference to FIGS. 3 and 4. For example, during the active period ACTIVE, the pixel PXij in FIG. 2 may emit light by writing a data signal. As such, in the active period ACTIVE, the gate driver 17 may provide the first, second, and third gate signals and the light-emitting signal, each having a pulse, to the first, second, and third gate lines SC1*i*, SC2*i*, and SC3*i*, and the light-emission line EMi, respectively. The first gate signal of the first gate line SC1*i* may have a pulse of a logic low level. The second gate signal of the second gate line SC2*i* may have a pulse of a logic high level. The third gate signal of the third gate line SC3*i* may have a pulse of a logic low level. The light-emitting signal of the emission line EMi may have a pulse of a logic high level. When the pulse of the light-emitting signal is output to the emission line EMi, the second gate signal of the second gate line SC2*i*, the first gate signal of the first gate line SC1*i*, and the third gate signal of the third gate line SC3*i* may be sequentially output. The waveforms of the first gate signal of the first gate line SC1*i*, the second gate signal of the second gate line SC2*i*, the signals applied to the third gate line SC3*i* and the emission line EMi may be the same or substantially the same as (or similar to) those of the signals applied to the first scan line GWi, the second scan line GCi (and/or the fourth scan line GIi), the third scan line GBi, and the emission line Emi, respectively, as described above with reference to FIG. 5B.

During the active period ACTIVE, the first clock signal CLK1, the second clock signal CLK2, the third clock signal CLK3, and the fourth clock signal CLK4 may periodically have a logic high level (e.g., a high voltage) and a logic low level (e.g., a low voltage). In other words, the first clock signal CLK1, the second clock signal CLK2, the third clock signal CLK3, and the fourth clock signal CLK4 may be toggled during the active period ACTIVE. The first clock signal CLK1, the second clock signal CLK2, the third clock signal CLK3, and the fourth clock signal CLK4 may be square waves. The first clock signal CLK1, the second clock signal CLK2, the third clock signal CLK3, and the fourth clock signal CLK4 may have the same or substantially the same waveform as each other, but the present disclosure is not limited thereto.

A blank period BLANK may correspond to the self-scan period SS described above with reference to FIGS. 3 and 4. For example, during the blank period BLANK, the pixel PXij of FIG. 2 may emit light without writing data. Accordingly, the gate driver 17 may provide a light-emitting signal having a pulse of a logic low level to the emission line EMi during the blank period BLANK, and may maintain or substantially maintain the first and second gate signals provided to the first and second gate lines SC1*i* and SC2*i*, respectively, at a constant or substantially constant voltage. In other words, the gate driver 17 may not output the first and second gate signals having pulses during the blank period BLANK. The gate driver 17 may provide a third gate signal having a pulse during the blank period BLANK to the third gate line SC3*i*.

During the blank period BLANK, the first clock signal CLK1 and the second clock signal CLK2 (e.g., signals applied to the first clock line and the second clock line) may maintain or substantially maintain a constant or substantially constant voltage. In other words, the timing controller 11 of FIG. 1 may maintain or substantially maintain the first clock signal CLK1 and the second clock signal CLK2 at a constant or substantially constant voltage during the blank period BLANK.

In an embodiment, during the blank period BLANK, each of the first clock signal CLK1 and the second clock signal CLK2 may be maintained or substantially maintained at a logic low level. However, the present disclosure is not limited thereto. For example, during the blank period BLANK, each of the first clock signal CLK1 and the second clock signal CLK2 may be maintained or substantially maintained at a logic high level.

In another embodiment, during the blank period BLANK, the first clock signal CLK1 and the second clock signal CLK2 may be maintained or substantially maintained at different constant or substantially constant voltages from each other. Referring to FIG. 8B, for example, during the blank period BLANK, the first clock signal CLK1 may be maintained or substantially maintained at a logic high level, and the second clock signal CLK2 may be maintained or substantially maintained at a logic low level. When the first stage ST1[*i*] includes a P-type transistor (e.g., only a P-type transistor), a corresponding transistor may be turned off in response to the logic high-level first clock signal CLK1, and a power consumption may be reduced.

Figure 9:
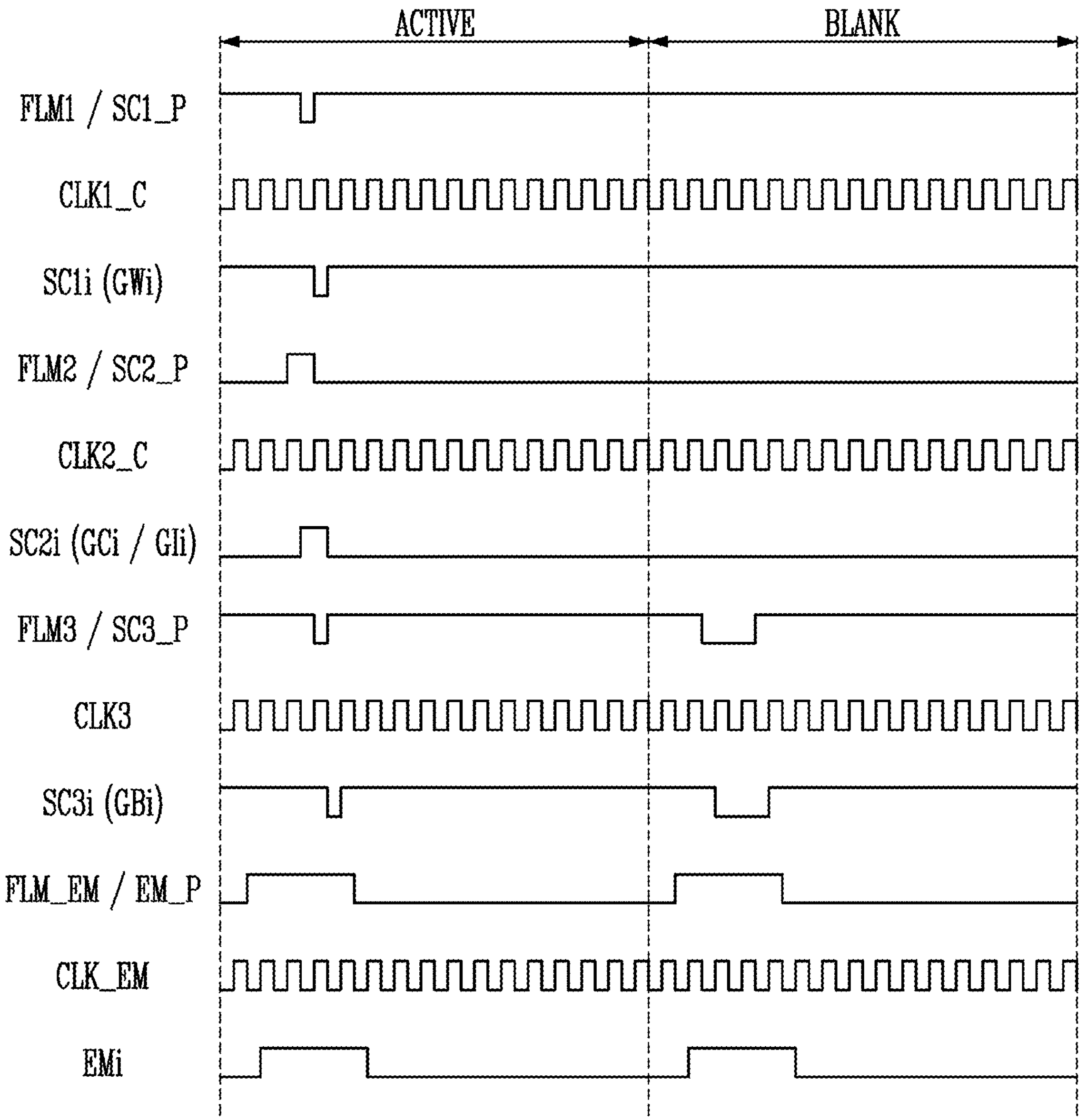
FIG. 9 is a waveform diagram showing a comparative example of operations of a gate driver.

FIG. 9 is a waveform diagram showing a comparative example of operations of a gate driver.

Referring to FIGS. 8A and 9, during the blank period BLANK, a first clock signal CLK1_C and a second clock signal CLK2_C according to the comparative example may be toggled. The transistors provided in the first stage ST1[*i*] and the second stage ST2[*i*] (e.g., refer to FIG. 7) are repeatedly turned on and off (e.g., are toggled) in response to the first clock signal CLK1_C and the second clock signal CLK2_C, and the capacitors provided in the first stage ST1[*i*] and the second stage ST2[*i*] are repeatedly charged and discharged. As a result, more power may be consumed.

According to some embodiments of the present disclosure, the first clock signal CLK1 and the second clock signal CLK2 may be maintained or substantially maintained at a constant or substantially constant voltage during the blank period BLANK. Therefore, operations of the transistors provided in the first stage ST1[*i*] and the second stage ST2[*i*], for example, such as toggling based on the first clock signal CLK1 and the second clock signal CLK2, may be stopped or prevented, and a power consumption may be reduced.

FIG. 10 is a schematic diagram of an equivalent circuit of an embodiment of the first stage ST1[*i*] included in the gate driver 17 of FIG. 7.

Referring to FIGS. 7 and 10, the first stage ST1[*i*] may include transistors M1*a* to M8*a*, and capacitors C1*a* and C2*a*. Each of the transistors M1*a* to M8*a* may be a P-type transistor.

Figure 11:
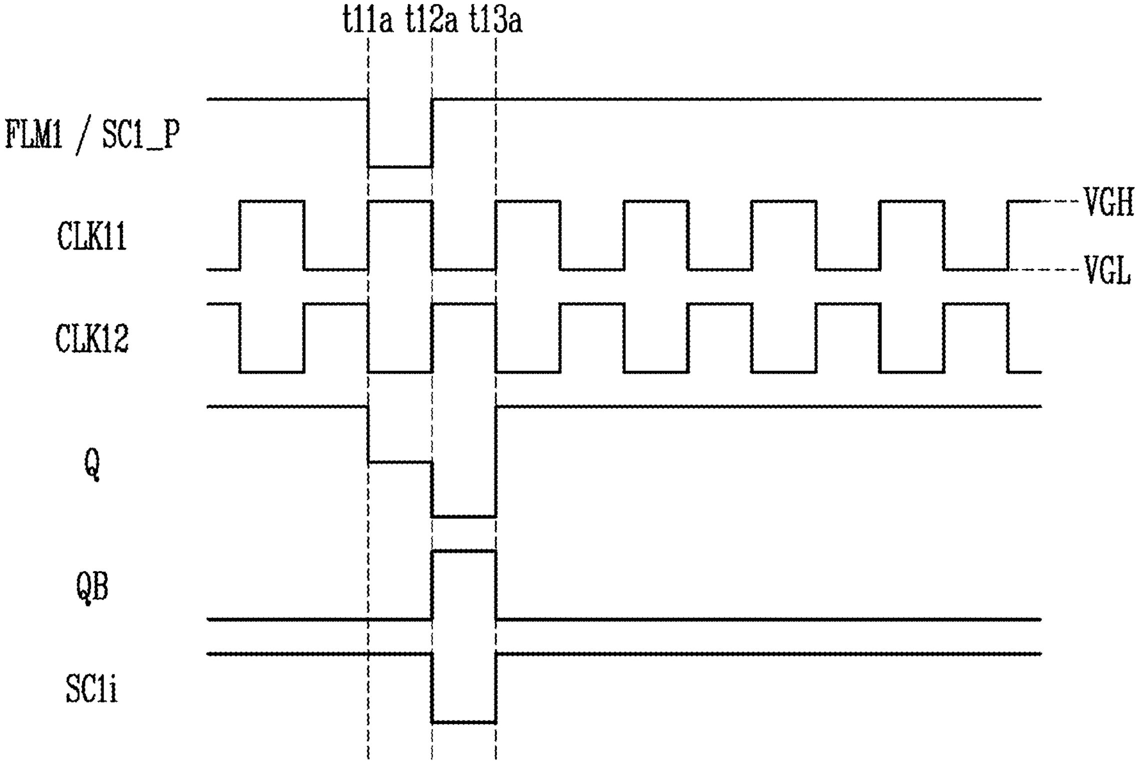
FIG. 11 is a waveform diagram illustrating operations of the first stage of FIG. 10.

A first transistor M1*a* may be connected between the input terminal IN (e.g., the input line) and a fifth node N5 (e.g., a third control node). A gate electrode of the first transistor M1*a* may be connected to a second clock input terminal CIN2 (e.g., a 12th clock line provided with a 12th clock signal CLK12). The input terminal IN may receive the first start signal FLM1, or the output SC1_P of the first previous stage located before the first stage ST1[*i*]. The 12th clock signal CLK12 may be provided to the second clock input terminal CIN2. An 11th clock signal CLK11 may be provided to a first clock input terminal CIN1. The 11th clock signal CLK11 may correspond to, or be included in, the first clock signal CLK1 as shown in FIG. 8A. The 12th clock signal CLK12 (e.g., a first inverted clock signal) may have a phase different from that of the 11th clock signal CLK11, for example, such as a phase delayed by half a period (e.g., 180 degrees) from that of the 11th clock signal CLK11, as shown in FIG. 11.

A second transistor M2*a* may be connected between the fifth node N5 and a node Q (e.g., the first control node), and a gate electrode of the second transistor M2*a* may be connected to a second power input terminal VIN2. The second power input terminal VIN2 may receive a low voltage VGL (e.g., a second gate power at a logic low level). The second transistor M2*a* and the first transistor M1*a* may constitute an input circuit that transmits the first start signal FLM1 or the output SC1_P of the first previous stage to the node Q.

A third transistor M3*a* may be connected between the output terminal OUT and the first clock input terminal CIN1 (e.g., the 11th clock line receiving the 11th clock signal CLK11), and a gate electrode of the third transistor M3*a* may be connected to the node Q. The output terminal OUT may be connected to the first gate line SC1*i*.

A first capacitor C1*a* may be connected between the node Q and the output terminal OUT.

A fourth transistor M4*a* may be connected between a first power input terminal VIN1 and the output terminal OUT, and a gate electrode of the fourth transistor M4*a* may be connected to a node QB (e.g., a second control node). The first power input terminal VIN1 may receive a high voltage VGH (e.g., a first gate power at a logic high level). The third transistor M3*a* and the fourth transistor M4*a* may constitute a buffer that outputs a gate signal.

A fifth transistor M5*a* may be connected between the node QB and the second clock input terminal CIN2, and a gate electrode thereof may be connected to the fifth node N5.

A sixth transistor M6*a* may be connected between the node QB and the second power input terminal VIN2, and a gate electrode thereof may be connected to the second clock input terminal CIN2.

A second capacitor C2*a* may be connected between the first power input terminal VIN1 and the node QB.

A seventh transistor M7*a* may be connected between the first power input terminal VIN1 and a sixth node N6, and a gate electrode thereof may be connected to the node QB.

An eighth transistor M8*a* may be connected between the sixth node N6 and the fifth node N5, and a gate electrode thereof may be connected to the first clock input terminal CIN1.

The embodiment of FIG. 10 may also be applied to the third stage ST3[*i*] of FIG. 7. In other words, the third stage ST3[*i*] of FIG. 7 may have a circuit that is the same or substantially the same as (or similar to) that of the first stage ST1[*i*]. For example, the third stage ST3[*i*] may also include first to eighth transistors M1*a* to M8*a* and first and second capacitors C1*a* and C2*a*, like those of the first stage ST1[*i*] described above.

FIG. 11 is a waveform diagram illustrating operations of the first stage of FIG. 10.

Referring to FIGS. 10 and 11, at an 11th time t11*a*, the first start signal FLM1 or the output SC1_P of the first previous stage may have a logic low level (e.g., the low voltage VGL), the 11th clock signal CLK11 may have a logic high level (e.g., the high voltage VGH), and the 12th clock signal CLK12 may have a logic low level.

In response to the 12th clock signal CLK12 at the logic low level (e.g., a gate-on voltage), the first transistor M1*a* may be turned on, the first start signal FLM1 or the output SC1_P of the first previous stage may be transmitted to the fifth node N5, and a voltage of the fifth node N5 may transition to a logic low level. Because the fifth node N5 and the node Q are connected to each other by the turned-on second transistor M2*a*, a voltage of the node Q may transition to a logic low level in response to the voltage of the fifth node N5. In response to the voltage of the node Q, the third transistor M3*a* may be turned on, and the 11th clock signal CLK11 may be output as a first gate signal to the first gate line SC1*i*. However, because the 11th clock signal CLK11 is at a logic high level, the first gate signal of the first gate line SC1*i* may be maintained or substantially maintained at a logic high level.

A voltage corresponding to the difference between the logic low level and the logic high level may be stored in the first capacitor Ca. In response to the 12th clock signal CLK12, the sixth transistor M6*a* may be turned on, the low voltage VGL may be provided to the node QB, and the node QB may be maintained or substantially maintained at a logic low level. The fourth transistor M4*a* may be turned on in response to the voltage of the node QB, the high voltage VGH may be provided to the output terminal OUT through the fourth transistor M4*a*, and the first gate signal of the first gate line SC1*i* may be maintained or substantially maintained at a logic high level.

Subsequently, at a 12th time t12*a*, the 11th clock signal CLK11 may have a logic low level, and the 12th clock signal CLK12 may have a logic high level. Because the 11th clock signal CLK11 is output as a first gate signal to the first gate line SC1*i* through the turned-on third transistor M3*a*, the first gate signal of the first gate line SC1*i* may transition to a logic low level.

The node Q may be bootstrapped by the first capacitor C1*a*, so that the voltage of the node Q may transition to a level that is lower than that of the logic low level.

Because the fifth transistor M5*a* is turned on in response to the voltage of the fifth node N5, the 12th clock signal CLK12 may be provided to the node QB, and the voltage of the node QB may transition to the logic high level.

Subsequently, at a 13th time t13*a*, the first start signal FLM1 or the output SC1_P of the first previous stage may have a logic low level, the 11th clock signal CLK11 may have a logic high level, and the 12th clock signal CLK12 may have a logic low level.

Accordingly, the first transistor M1*a* may be turned on, the first start signal FLM1 of the logic low level or the output SC1_P of the first previous stage may be transmitted to the fifth node N5 and the node Q, the voltage of the node Q may transition to the logic high level, and the third transistor M3*a* may be turned off. In response to the 12th clock signal CLK12, the sixth transistor M6*a* may be turned on, the low voltage VGL may be provided to the node QB, and the node QB may transition to the logic low level. The fourth transistor M4*a* may be turned on in response to the voltage of the node QB, the high voltage VGH may be provided to the output terminal OUT by the fourth transistor M4*a*, and the first gate signal of the first gate line SC1*i* may transition to a logic high level.

As described above with reference to FIG. 8A, during the blank period BLANK, the 11th clock signal CLK11 (and the 12th clock signal CLK12) may be maintained or substantially maintained at a constant or substantially constant voltage of a logic low level, so that the toggling of the first transistor M1*a* and the eighth transistor M8*a* may be stopped or prevented, and a power consumption may be reduced. On the other hand, as described above with reference to FIG. 8B, during the blank period BLANK, the 11th clock signal CLK11 (and the 12th clock signal CLK12) may be maintained or substantially maintained at a constant or substantially constant voltage of a logic high level, so that the first transistor M1*a* and the eighth transistor M8*a* may be maintained or substantially maintained in a turn-off state, and a power consumption may be reduced.

FIG. 12 is a schematic diagram of an equivalent circuit of an embodiment of the second stage ST2[*i*] included in the gate driver 17 of FIG. 7.

Referring to FIGS. 7 and 12, the second stage ST2[*i*] may include transistors M1 to M11, and capacitors C1 and C2.

Figure 13:
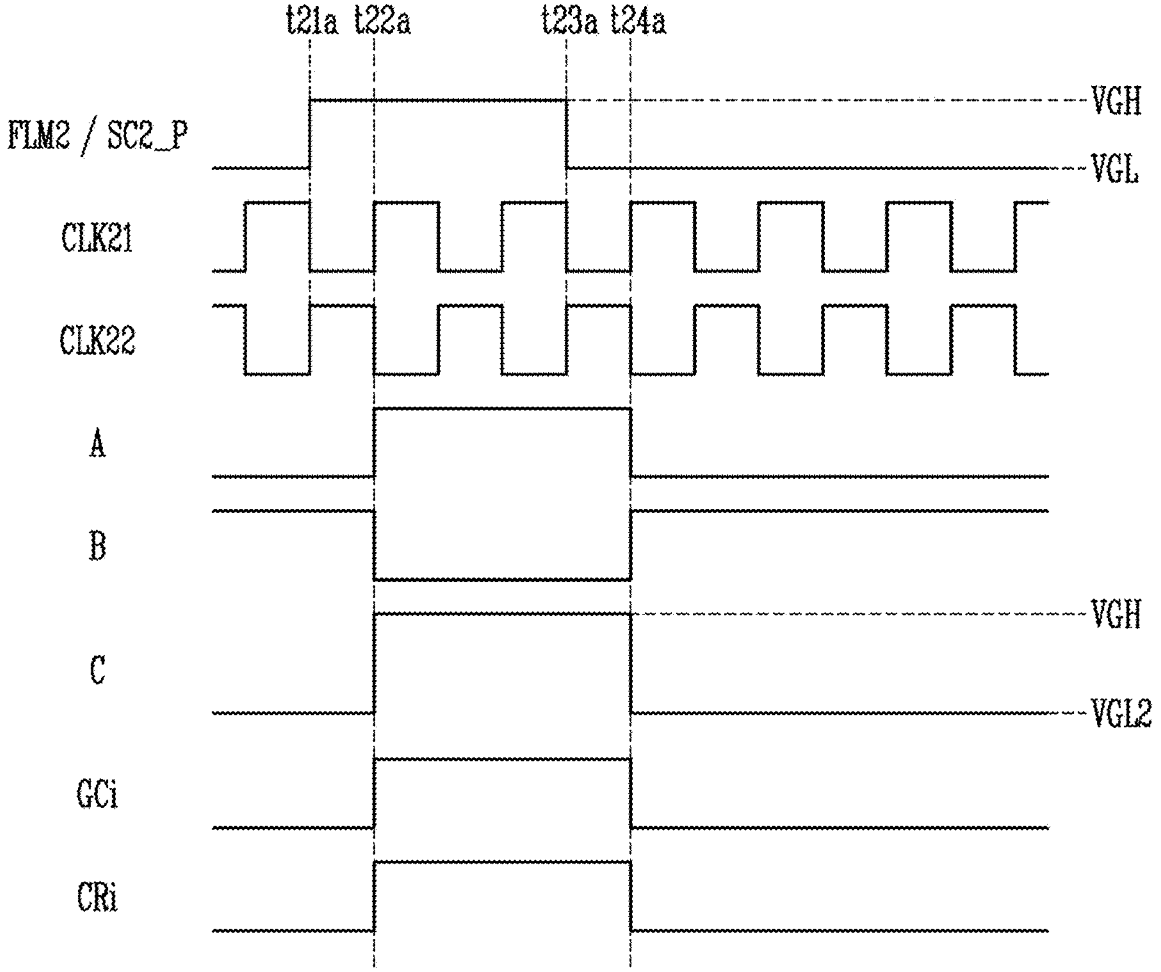
FIG. 13 is a waveform diagram illustrating operations of the second stage of FIG. 12.

A first transistor M1 may be connected between the input terminal IN (e.g., the input line) and a node A (e.g., a first node), and a gate electrode thereof may be connected to the second clock input terminal CIN2 (e.g., a 22nd clock line receiving a 22nd clock signal CLK22). The first transistor M1 may be a P-type transistor. The input terminal IN may receive the output SC2_P of a second previous stage located before the second stage ST2[*i*], or the second start signal FLM2. The 22nd clock signal CLK22 may be provided to the second clock input terminal CIN2. A 21 st clock signal CLK21 may be provided to the first clock input terminal CIN1. The 21st clock signal CLK21 may correspond to, or be included in, the second clock signal CLK2 as shown in FIG. 8A. The 22nd clock signal CLK22 (e.g., a second inverted clock signal) may have a phase different from that of the 21st clock signal CLK21, for example, such as a phase delayed by half a period (e.g., 180 degrees) from the 21st clock signal CLK21, as shown in FIG. 13.

A second transistor M2 may be connected between the input terminal IN and the node A, and a gate electrode thereof may be connected to the first clock input terminal CIN1 (e.g., the 21st clock line receiving the 21 st clock signal CLK21). The second transistor M2 may be an N-type transistor. The second transistor M2 may further include a lower electrode, and the lower electrode may be connected to a third power input terminal VIN3. The third power input terminal VIN3 may receive a second low voltage VGL2 (e.g., a third gate power), and the second low voltage VGL2 may have a voltage level lower than or equal to that of the low voltage VGL, but the present disclosure is not limited thereto.

The first transistor M1 and the second transistor M2 may delay the second start signal FLM2 or the output SC2_P of the second previous stage by half a period, and may provide the delayed output to the node A.

A third transistor M3 may be connected between the first power input terminal VIN1 (e.g., the high voltage VGH) and a B node (e.g., the second node), and a gate electrode thereof may be connected to the node A. The third transistor M3 may be a P-type transistor.

A fourth transistor M4 may be connected between the B node (e.g., the second node) and the second power input terminal VIN2 (e.g., the low voltage VGL), and a gate electrode thereof may be connected to the node A. The fourth transistor M4 may be an N-type transistor. The fourth transistor M4 may further include a lower electrode, and the lower electrode may be connected to the third power input terminal VIN3. The third transistor M3 and the fourth transistor M4 may constitute a CMOS transistor. The CMOS transistor may prevent or substantially prevent a bleeding current that basically flows between the first power input terminal VIN1 and the second power input terminal VIN2, may reduce a power consumption, and may improve integration.

A first capacitor C1 may be connected between the first power input terminal VIN1 and the node A.

A fifth transistor M5 may be connected between the first power input terminal VIN1 and the output terminal OUT, and a gate electrode thereof may be connected to the B node. The fifth transistor M5 may be a P-type transistor. The output terminal OUT may be connected to the second gate line SC2*i*.

A sixth transistor M6 may be connected between the output terminal OUT and the second power input terminal VIN2, and a gate electrode thereof may be connected to the B node. The sixth transistor M6 may be an N-type transistor. The sixth transistor M6 may further include a lower electrode, and the lower electrode may be connected to the third power input terminal VIN3. The fifth transistor M5 and the sixth transistor M6 may constitute a CMOS transistor.

A seventh transistor M7 may be connected between the node A and a node C (e.g., a third node), and a gate electrode thereof may be connected to the second power input terminal VIN2. The seventh transistor M7 may be a P-type transistor.

An eighth transistor M8 may be connected between the output terminal OUT and the second power input terminal VIN2, and a gate electrode thereof may be connected to the node C. The eighth transistor M8 may be a P-type transistor.

A ninth transistor M9 may be connected between the first power input terminal VIN1 and a carry output terminal COUT, and a gate electrode thereof may be connected to the B node. The ninth transistor M9 may be a P-type transistor. The carry output terminal COUT may be connected to a carry line CRi. A carry signal that is output through the carry output terminal COUT may be the output SC2_P of the second previous stage, and may be provided to a stage located after the second stage ST2[*i*].

A 10th transistor M10 may be connected between the carry output terminal COUT and the second power input terminal VIN2, and a gate electrode thereof may be connected to the B node. The 10th transistor M10 may be an N-type transistor. The 10th transistor M10 may further include a lower electrode, and the lower electrode may be connected to the third power input terminal VIN3. The ninth transistor M9 and the 10th transistor M10 may constitute a CMOS transistor.

A second capacitor C2 may be connected between the node C and the carry output terminal COUT.

An 11th transistor M11 may be connected between the first power input terminal VIN1 and the node A, and a gate electrode thereof may receive a gate control signal ESR. When the 11th transistor M11 is turned on in response to the gate control signal ESR, regardless of the second start signal FLM2 or the output SC2_P of the second previous stage, the second stage ST2[*i*] may output a second gate signal of a logic high level (e.g., a gate on voltage) through the output terminal OUT.

The embodiment of FIG. 12 may also be applied to the emission stage ST_EM[i] described above with reference to FIG. 7. In other words, the emission stage ST_EM[i] of FIG. 7 may have a circuit that is the same or substantially the same as (or similar to) that of the second stage ST2[*i*]. For example, the emission stage ST_EM[i] may also include first to eleventh transistors M1 to M11 and first and second capacitors C1 and C2, like those of the second stage ST2[*i*] described above.

FIG. 13 is a waveform diagram illustrating operations of the second stage of FIG. 12.

Referring to FIGS. 12 and 13, at a 21st time t21*a*, the second start signal FLM2 or the output SC2_P of the second previous stage may have a logic high level (e.g., the high voltage VGH), the 21st clock signal CLK21 may have a logic low level (e.g., the low voltage VGL), and the 22nd clock signal CLK22 may have a logic high level. Because the first transistor M1 and the second transistor M2 are turned off, the voltage of the node A may be maintained or substantially maintained at a logic low level. In response to a voltage of the node A, the third transistor M3 may be turned on, the high voltage VGH may be provided to the B node, and a voltage of the B node may be maintained or substantially maintained at a logic high level. In response to the voltage of the B node, the sixth transistor M6 may be turned on, the low voltage VGL may be provided to the output terminal OUT, and the second gate signal of the second gate line SC2*i* may have a logic low level. Similarly, in response to the voltage of the B node, the 10th transistor M10 may be turned on, the low voltage VGL may be provided to the carry output terminal COUT, and the carry signal of the carry line CRi may have a logic low level. The voltage of the node C may be maintained or substantially maintained to be equal to or substantially equal to the second low voltage VGL2 by the second capacitor C2.

At a 22nd time t22*a*, the 21st clock signal CLK21 may have a logic high level, and the 22nd clock signal CLK22 may have a logic low level. In response to the 21st clock signal CLK21 and the 22nd clock signal CLK22, the first transistor M1 and the second transistor M2 may be turned on, the second start signal FLM2 or the output SC2_P of the second previous stage may be transmitted to the node A, and a voltage of the node A may transition to a logic high level. In response to the voltage of the node A, the fourth transistor M4 may be turned on, the low voltage VGL may be provided to the B node, and a voltage of the B node may transition to a logic low level. In response to the voltage of the B node, the fifth transistor M5 may be turned on, the high voltage VGH may be provided to the output terminal OUT, and the second gate signal of the second gate line SC2*i* may transition to a logic high level. Similarly, in response to the voltage of the B node, the ninth transistor M9 may be turned on, the high voltage VGH may be provided to the carry output terminal COUT, and the carry signal of the carry line CRi may transition to a logic high level. Because the node C may be connected to the node A through the seventh transistor M7, the voltage of the node C may transition to a logic high level.

At a 23rd time t23*a*, the second start signal FLM2 or the output SC2_P of the second previous stage may transition to a logic low level, the 21 st clock signal CLK21 may have a logic low level, and the 22nd clock signal CLK22 may have a logic high level. Because the first transistor M1 and the second transistor M2 are turned off, the voltage of the node A may be maintained or substantially maintained at a logic high level. Similarly to the 22nd time t22*a*, according to a voltage of the node A, a voltage of the B node may be maintained or substantially maintained at a logic low level, a voltage of the node C may be maintained or substantially maintained as a logic high level, the second gate signal of the second gate line SC2*i* may be maintained or substantially maintained at the logic high level, and the carry signal of the carry line CRi may be maintained or substantially maintained as the logic high level.

At a 24th time t24*a*, the 21st clock signal CLK21 may have a logic high level, and the 22nd clock signal CLK22 may have a logic low level. In response to the 21st clock signal CLK21 and the 22nd clock signal CLK22, the first transistor M1 and the second transistor M2 may be turned on, the second start signal FLM2 or the output SC2_P of the second previous stage may be transmitted to the node A, and a voltage of the node A may transition to a logic low level. In response to the voltage of the node A, the third transistor M3 may be turned on, the high voltage VGH may be provided to the B node, and the voltage of the B node may transition to a logic high level. In response to the voltage of the B node, the sixth transistor M6 may be turned on, the low voltage VGL may be provided to the output terminal OUT, and the second gate signal of the second gate line SC2*i* may transition to a logic low level. Similarly, in response to the voltage of the B node, the 10th transistor M10 may be turned on, the low voltage VGL may be provided to the carry output terminal COUT, and the carry signal of the carry line CRi may transition to a logic low level.

As described above with reference to FIG. 8A, during the blank period BLANK, the 21st clock signal CLK21 (and the 22nd clock signal CLK22) may be maintained or substantially maintained at a constant or substantially constant voltage of a logic low level, and toggling of the first transistor M1 and the second transistor M2 may be stopped or prevented, and thus, a power consumption may be reduced. In contrast, during the blank period BLANK, the 21st clock signal CLK21 may be maintained or substantially maintained at a constant or substantially constant voltage at a logic low level, and the 22nd clock signal CLK22 may be maintained or substantially maintained at a constant or substantially constant voltage at the logic high level, so that the first transistor M1 and the second transistor M2 may be maintained or substantially maintained in the turn-off state, and thus, a power consumption may be reduced.

Figure 14:
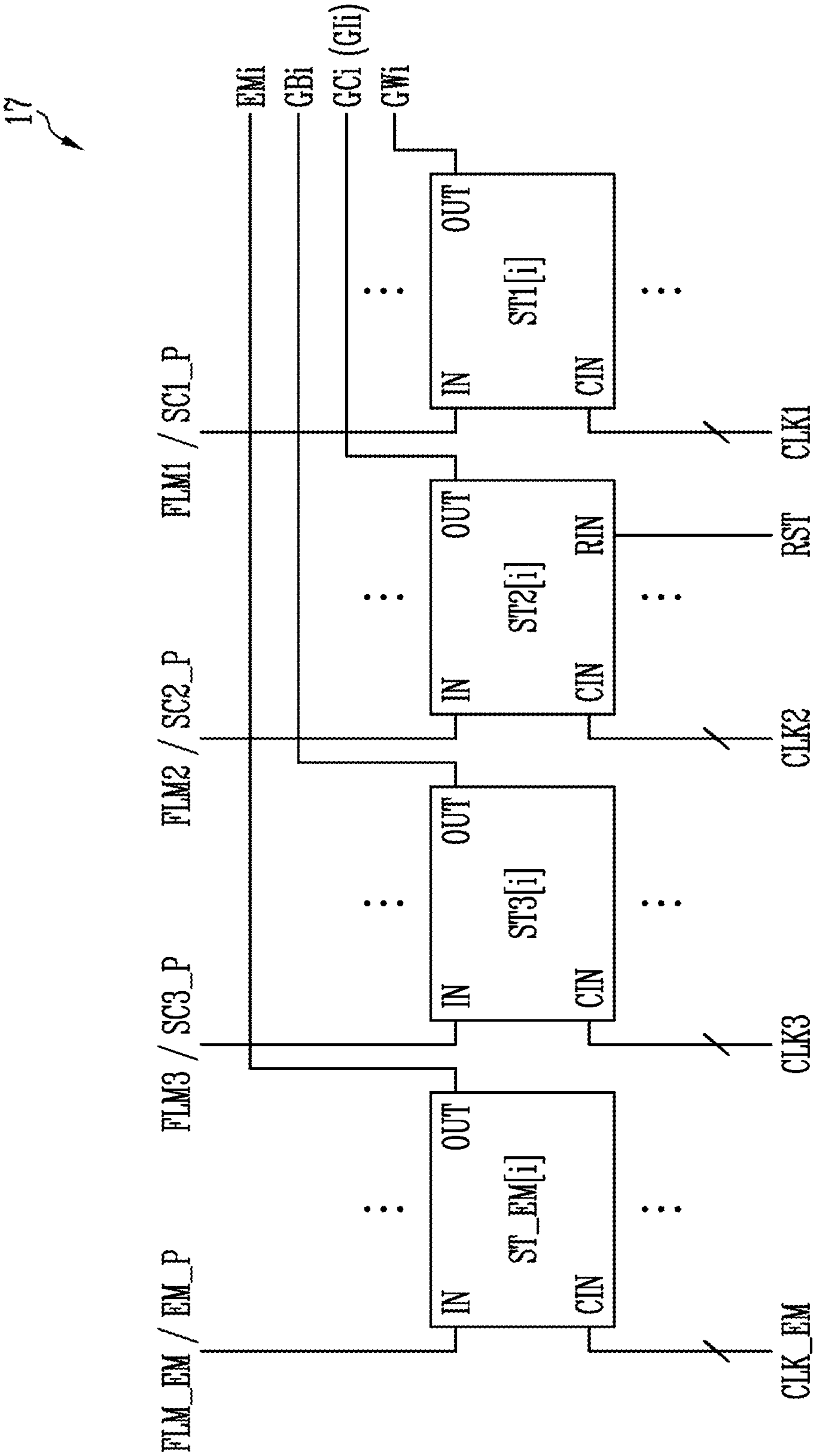
FIG. 14 is a diagram illustrating an embodiment of a gate driver included in the display device of FIG. 1.

FIG. 14 is a diagram illustrating an embodiment of the gate driver 17 included in the display device 10 of FIG. 1.

Referring to FIGS. 7 and 14, the embodiment of FIG. 14 may be the same or substantially the same as (or similar to) the embodiment described above with reference to FIG. 7, except for a reset signal RST. Therefore, redundant description may not be repeated hereinafter, and the differences may be mainly described in more detail.

Figure 15:
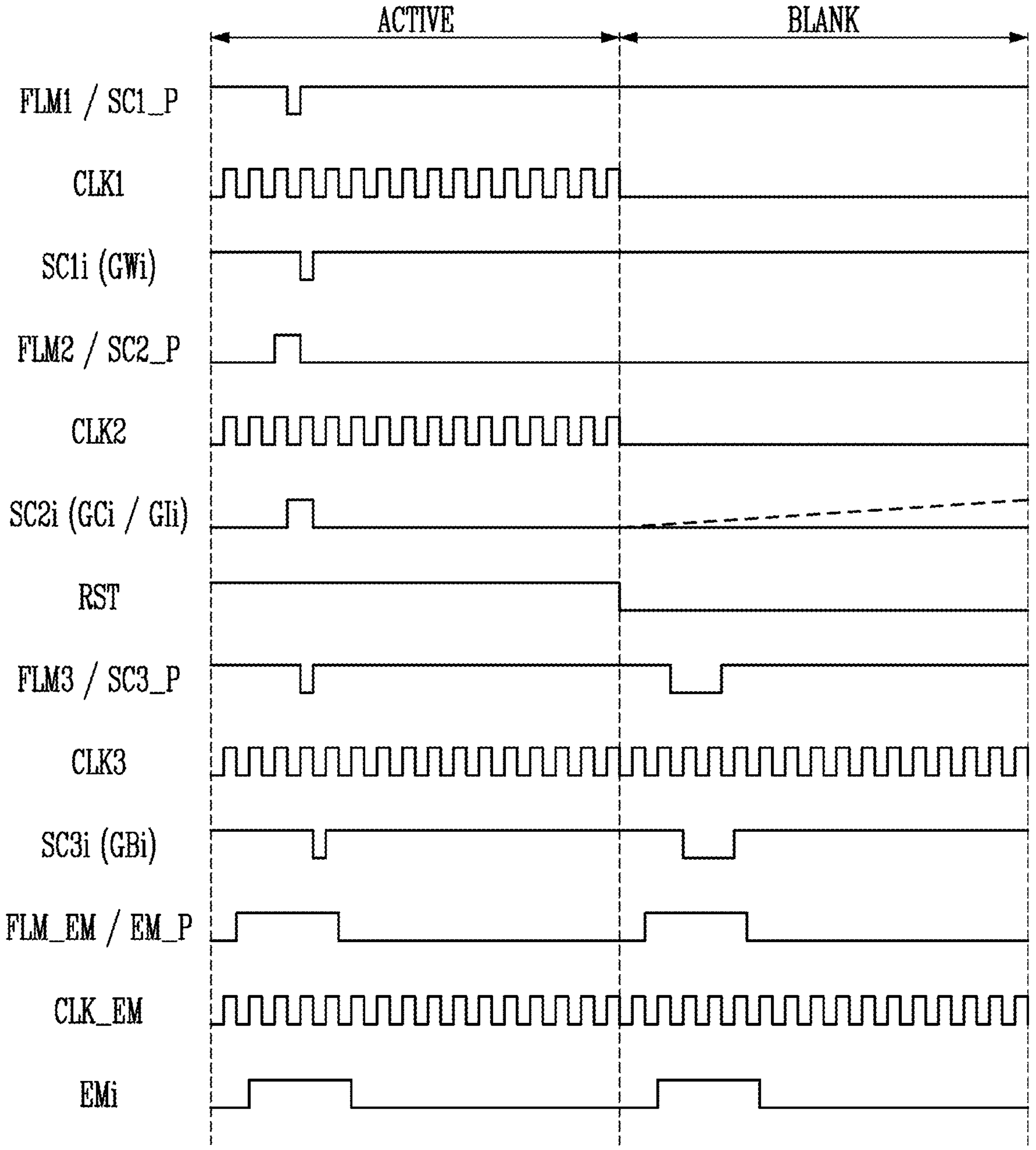
FIG. 15 is a waveform diagram illustrating an embodiment of operations of the gate driver of FIG. 14.

Referring to FIG. 14, the second stage ST2[*i*] may further include a reset input terminal RIN, and the reset input terminal RIN (e.g., a reset line) may receive a reset signal RST. The reset signal RST may be provided during the blank period BLANK as shown in FIG. 15, and the second stage ST2[*i*] may maintain or substantially maintain the second gate signal of the second gate line SC2*i* at the logic low level in response to the reset signal RST. The reset signal RST may not be provided to the first stage ST1[*i*], the third stage ST3[*i*], and the emission stage ST_EM[i]. In other words, the first stage ST1[*i*], the third stage ST3[*i*], and the emission stage ST_EM[i] may operate independently of the reset signal RST.

FIG. 15 is a waveform diagram illustrating an embodiment of operations of the gate driver of FIG. 14.

Referring to FIGS. 8A, 14, and 15, except for the reset signal RST, the embodiment of FIG. 15 is the same or substantially the same as (or similar to) that described above with reference to FIG. 8A, and thus, redundant description thereof may not be repeated.

Referring to FIG. 15, during the active period ACTIVE, the reset signal RST may have a logic high level (e.g., a gate-off voltage). The second stage ST2[*i*] may provide the second gate signal to the second gate line SC2*i* by shifting the second start signal FLM2 or the output SC2_P of the second previous stage by using the second clock signal CLK2 without any further operation based on the reset signal RST.

During the blank period BLANK, the reset signal RST may have a logic low level (e.g., a gate-on voltage). The second stage ST2[*i*] may pull down or maintain the second gate signal of the second gate line SC2*i* to the logic low level in response to the reset signal RST. For example, when the second clock signal CLK2 is maintained or substantially maintained at a constant or substantially constant voltage during the blank period BLANK, the second gate signal of the second gate line SC2*i* may rise above the logic low level over time due to a leakage in the second stage ST2[*i*]. Therefore, the second stage ST2[*i*] according to some embodiments may further use the reset signal RST to maintain or substantially maintain the second gate signal of the second gate line SC2*i* at the logic low level.

Figure 16A:
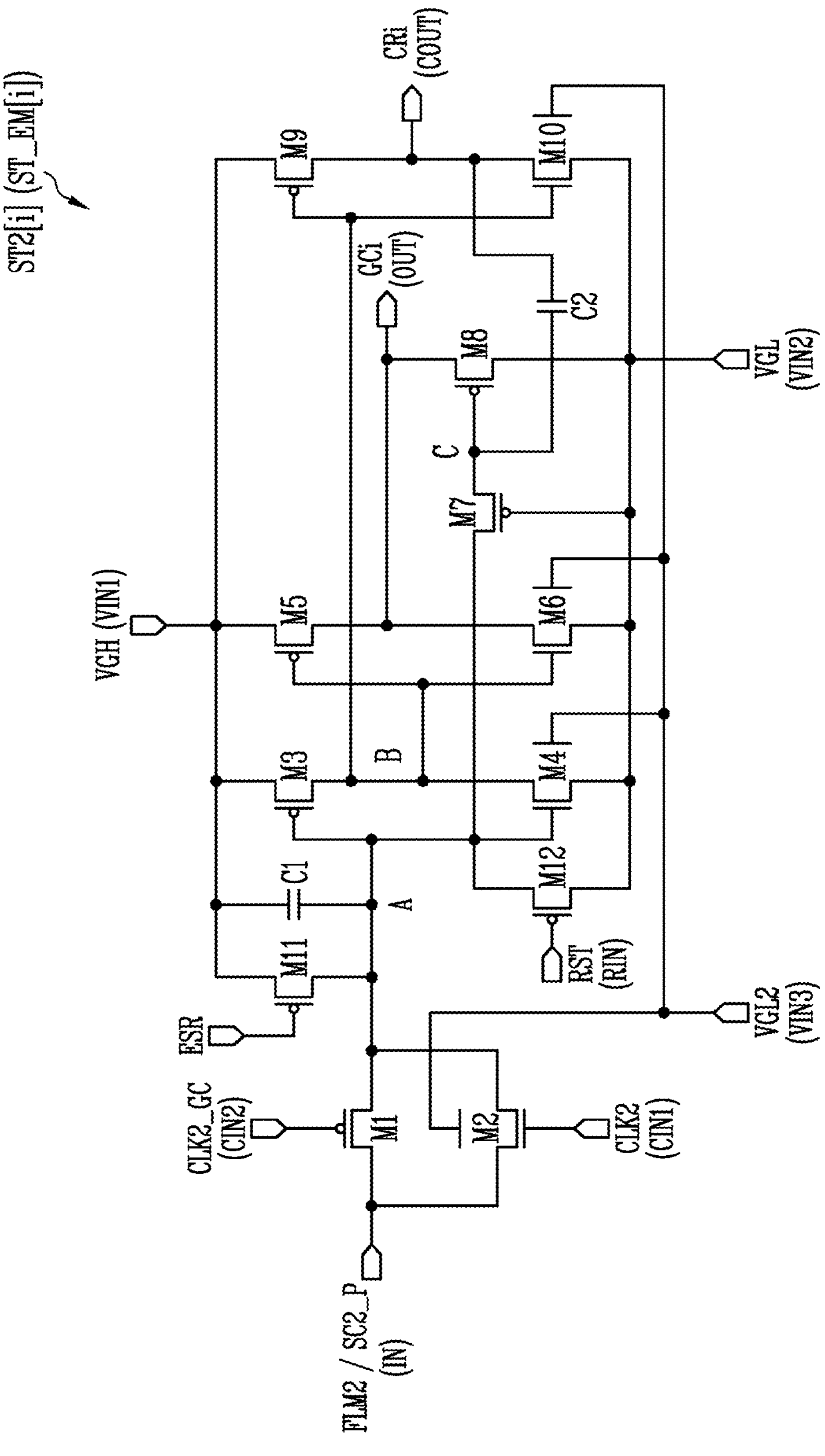
FIGS. 16A and 16B are schematic diagrams of an equivalent circuit of a second stage included in the gate driver of FIG. 14 according to some embodiments.
Figure 16B:
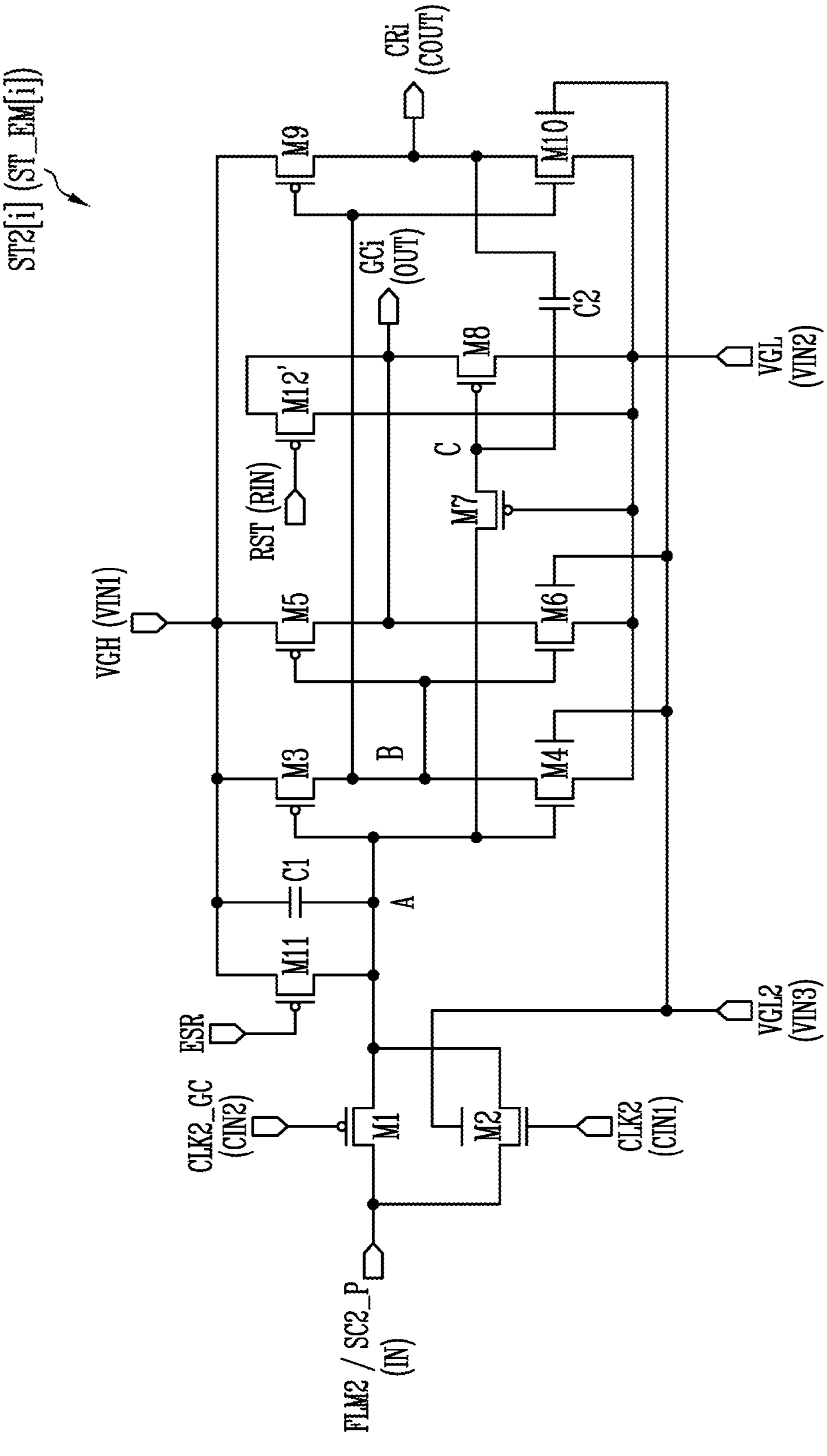

FIGS. 16A and 16B are schematic diagrams of an equivalent circuit of the second stage included in the gate driver of FIG. 14 according to some embodiments.

First, referring to FIGS. 12 and 16A, the embodiment of FIG. 16A may be the same or substantially the same as (or similar to) that described above with reference to FIG. 12, except for a 12th transistor M12. Therefore, redundant description thereof may not be repeated.

Referring to FIG. 16A, the second stage ST2[*i*] may further include the 12th transistor M12 (e.g., a reset transistor).

The 12th transistor M12 may be connected between the node A and the second power input terminal VIN2, and a gate electrode thereof may be connected to the reset input terminal RIN. The 12th transistor M12 may be a P-type transistor.

Referring to FIG. 15, during the active period ACTIVE, the reset signal RST may have a logic high level, and the 12th transistor M12 may be turned off. Thus, because the 12th transistor M12 may be virtually excluded, the second stage ST2[*i*] may operate in the same or substantially the same manner as that of the embodiment described above with reference to FIG. 14.

During the blank period BLANK, the reset signal RST may have a logic low level, and the 12th transistor M12 may be turned on. Thus, a voltage of the node A may be maintained or substantially maintained at a logic low level. In response to a voltage of the node A, the third transistor M3 may be turned on to maintain or substantially maintain a voltage of the B node at a logic high level. In response to the voltage of the B node, the sixth transistor M6 may be turned on to maintain or substantially maintain the second gate signal of the second gate line SC2*i* at a logic low level.

As described above with reference to FIG. 16A, the 12th transistor M12 may be connected between the node A and the second power input terminal VIN2. However, the present disclosure is not limited thereto. For example, the 12th transistor M12 may be connected between the node A and the third power input terminal VIN3. In some embodiments, referring to FIG. 16B, for example, a 12th transistor M12' may be connected between the output terminal OUT and the second power input terminal VIN2 (or a third power input terminal VIN3). As another example, instead of the 12th transistor M12 or M12', the second stage ST2[*i*] may include a transistor that is connected between the B node and the first power input terminal VIN1, and a gate electrode of the transistor may receive the reset signal RST.

A display device according to some embodiments of the present disclosure may be applicable to various suitable kinds of electronic devices. In an embodiment, an electronic device includes the above-described display device, and may further include other suitable modules or devices having additional functions in addition to those of the display device.

Figure 17:
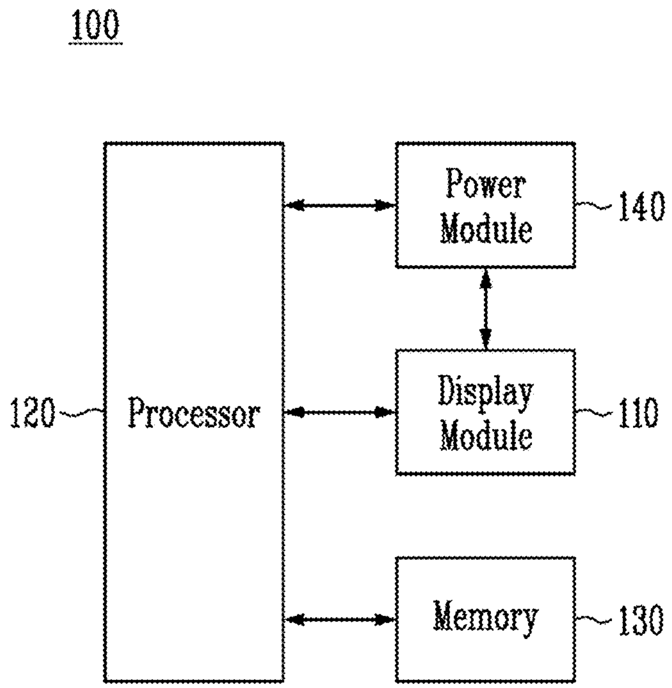
FIG. 17 is a block diagram of an electronic device according to an embodiment.

FIG. 17 is a block diagram of an electronic device 100 according to an embodiment. Referring to FIG. 17, the electronic device 100 may include a display module 110 (e.g., a display device), a processor 120, a memory 130, and a power module 140 (e.g., a power source or a power circuit).

The processor 120 may include at least one of a central processing unit (CPU), an application processor (AP), a graphic processing unit (GPU), a communication processor (CP), an image signal processor (ISP), or a controller.

The memory 130 may store data and/or information used to operate the processor 120 or the display module 110. When the processor 120 executes an application stored in the memory 130, image data signals and/or input control signals may be transferred to the display module 110. The display module 110 may process the provided signals, and may output image information on a display screen.

The power module 140 may include a power supply module (e.g., a power supply or a power supply circuit), such as a power adapter or a battery device, and a power conversion module (e.g., a power converter or a power conversion circuit). The power conversion module converts power supplied by the power supply module, and generates power to operate the electronic device 100.

At least one of the above-described components of the electronic device 100 may be included in the display device according to some of the embodiments as described above. In addition, in terms of functionality, some of the individual modules included in one module may be included in the display device, and others may be provided separately from the display device. For example, the display module 110 may be included in the display device, whereas the processor 120, the memory 130, and the power module 140 may not be included in the display device and may be instead provided separately in the electronic device 100.

Figure 18:
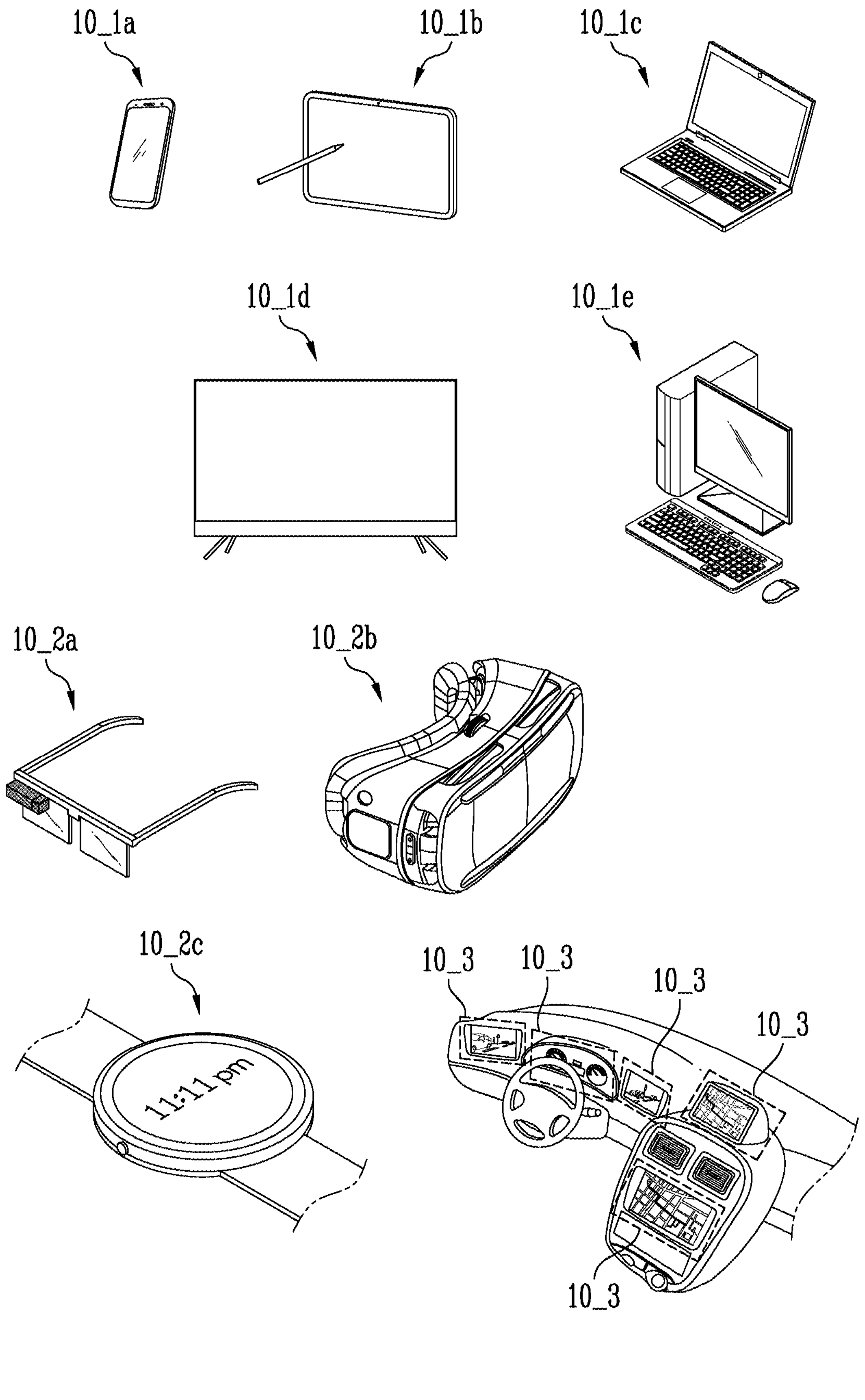
FIG. 18 shows schematic representations of an electronic device according to some embodiments.

FIG. 18 shows schematic representations of an electronic device according to some embodiments.

Referring to FIG. 18, various kinds of electronic devices to which some of the embodiments of a display device described above may be applied to display images may include a smartphone 10_1*a*, a tablet PC 10_1*b*, a laptop computer 10_1*c*, a television (TV) 10_1*d*, and a desktop monitor 10_1*e*. The electronic devices may include a wearable electronic device including a display module (e.g., a display device), such as smart glasses 10_2*a*, a head-mounted display (HMD) 10_2*b*, and a smart watch 10_2*c*. The electronic devices may include an automotive electronic device 10_3 including a display module (e.g., a display device), such as a center information display (CID) disposed at an instrument cluster, a center fascia, and a dashboard of a vehicle, and a room mirror display.

According to some embodiments, a display device and an electronic device may maintain or substantially maintain a first clock signal for a first gate signal and a second clock signal for a second gate signal at a constant or substantially constant voltage during a blank period, so that a power consumption may be reduced.

According to some embodiments, a gate driver may include a second stage that outputs a second gate signal, and the second stage may include a CMOS transistor, so that a power consumption may be reduced.

However, the aspects and features of the present disclosure are not limited to those described above, and other various aspects and features may be ascertained from the above with reference to the figures.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device, comprising:

a display panel comprising a pixel connected to a first gate line, a second gate line, a third gate line, and a light emission control line;

a gate driver configured to provide a first gate signal to the first gate line in response to a first clock signal, a second gate signal to the second gate line in response to a second clock signal, a third gate signal to the third gate line in response to a third clock signal, and an emission control signal to the light emission control line in response to a fourth clock signal; and a timing controller configured to provide the first to fourth clock signals to the gate driver, wherein the gate driver is configured to:

output the first gate signal, the second gate signal, the third gate signal, and the emission control signal, each having a pulse, during an active period; and output the emission control signal having a pulse, while maintaining the first and second gate signals at a constant voltage, during a blank period, and wherein the timing controller is configured to:

provide, to the gate driver during the active period, the first to fourth clock signals that toggle between a logic high level and a logic low level; and maintain the first and second clock signals at a constant voltage during the blank period.

2. The display device according to claim 1, wherein the timing controller is configured to provide, to the gate driver during the blank period, the third and fourth clock signals that toggle.

3. The display device according to claim 1, wherein the gate driver is configured to sequentially output the second gate signal, the first gate signal, and the third gate signal, while outputting the pulse of the emission control signal, during the active period, and wherein the pulse of the first gate signal has the logic low level, the pulse of the second gate signal has the logic high level, the pulse of the third gate signal has the logic low level, and the pulse of the emission control signal has the logic high level.

4. The display device according to claim 3, wherein the timing controller is configured to maintain each of the first and second clock signals at the logic low level during the blank period.

5. The display device according to claim 1, wherein the timing controller is configured to maintain the first clock signal and the second clock signal at different constant voltages from each other during the blank period.

6. The display device according to claim 5, wherein the timing controller is configured to maintain the first clock signal at the logic high level and the second clock signal at the logic low level during the blank period.

7. The display device according to claim 1, wherein the pixel comprises:

a light emitting element;

a first thin film transistor configured to control an amount of current provided to the light emitting element;

a second thin film transistor connected between a data line and a first electrode of the first thin film transistor, and comprising a gate electrode connected to the first gate line;

a third thin film transistor connected between a gate electrode of the first thin film transistor and a second electrode of the first thin film transistor, and comprising a gate electrode connected to the second gate line;

a fourth thin film transistor connected between the gate electrode of the first thin film transistor and an initialization power, and comprising a gate connected to a fourth gate line;

a fifth thin film transistor connected between a first power and the first electrode of the first thin film transistor, and comprising a gate electrode connected to the light emission control line;

a sixth thin film transistor connected between the second electrode of the first thin film transistor and an anode electrode of the light emitting element, and comprising a gate electrode connected to the light emission control line; and a seventh thin film transistor connected to the anode electrode of the light emitting element, and comprising a gate electrode connected to the third gate line.

8. The display device according to claim 7, wherein the pixel further comprises an eighth thin film transistor connected between the first electrode of the first thin film transistor and a bias power, and comprising a gate electrode connected to the third gate line, and wherein the gate driver is configured to output the third gate signal having the pulse during the blank period.

9. The display device according to claim 1, wherein the gate driver comprises:

a first stage configured to output the first gate signal; and a second stage configured to output the second gate signal, and wherein the second stage comprises a CMOS transistor.

10. The display device according to claim 9, wherein the second stage comprises:

a first transistor connected between a first node and an input line configured to receive a second start signal or a second previous gate signal, and comprising a gate electrode connected to a 22nd clock line;

a second transistor connected between the input line and the first node, and comprising a gate electrode connected to a 21st clock line;

a third transistor connected between a first gate power and a second node, and comprising a gate electrode connected to the first node;

a fourth transistor connected between the second node and a second gate power, and comprising a gate electrode connected to the first node;

a fifth transistor connected between the first gate power and the second gate line, and comprising a gate electrode connected to the second node; and a sixth transistor connected between the second gate line and the second gate power, and comprising a gate electrode connected to the second node, wherein the 21st clock line is configured to receive the second clock signal, and wherein the 22nd clock line is configured to receive a second inverting clock signal having a phase delayed by half a period from the second clock signal.

11. The display device according to claim 10, wherein each of the first, third, and fifth transistors is a P type transistor, and wherein each of the second, fourth, and sixth transistors is an N type transistor.

12. The display device according to claim 10, wherein the second stage comprises:

a seventh transistor connected between the first node and a third node, and comprising a gate electrode connected to the second gate power;

an eighth transistor connected between the second gate line and the second gate power, and comprising a gate electrode connected to the third node;

a ninth transistor connected between the first gate power and a carry line, and comprising a gate electrode connected to the second node; and a tenth transistor connected between the carry line and the second gate power, and comprising a gate electrode connected to the second node.

13. The display device according to claim 9, wherein the gate driver further comprises:

a third stage configured to output the third gate signal; and an emission stage configured to output the emission control signal, wherein the third stage has a same circuit configuration as that of the first stage, wherein the emission stage has a same circuit configuration as that of the second stage, and wherein the second stage has a different circuit configuration from that of the first stage.

14. The display device according to claim 1, wherein the gate driver is configured to maintain the second gate signal at the logic low level in response to a reset signal, and maintain the first gate signal at the logic high level regardless of the reset signal during the blank period.

15. The display device according to claim 14, wherein the reset signal has a gate-off voltage during the active period, and a gate-on voltage during the blank period.

16. The display device according to claim 15, wherein the gate driver comprises a second stage configured to output the second gate signal, and wherein the second stage comprises:

a first transistor connected between a first node and an input line configured to receive a second start signal or a second previous gate signal, and comprising a gate electrode connected to a 22nd clock line;

a second transistor connected between the input line and the first node, and comprising a gate electrode connected to a 21st clock line;

a third transistor connected between a first gate power and a second node, and comprising a gate electrode connected to the first node;

a fourth transistor connected between the second node and a second gate power, and comprising a gate electrode connected to the first node;

a fifth transistor connected between the first gate power and the second gate line, and comprising a gate electrode connected to the second node;

a sixth transistor connected between the second gate line and the second gate power, and comprising a gate electrode connected to the second node; and a reset transistor connected between the first node and the second gate power, and comprising a gate electrode configured to receive the reset signal, wherein the 21st clock line is configured to receive the second clock signal, and wherein the 22nd clock line is configured to receive a second inverting clock signal having a phase delayed by half a period from the second clock signal.

17. The display device according to claim 1, wherein the gate driver comprises a first stage configured to output the first gate signal, and wherein the first stage comprises:

a first transistor connected between a third control node and an input line configured to receive a first start signal or a first previous gate signal, and comprising a gate electrode connected to a 12th clock line;

a second transistor connected between the third control node and a first control node, and comprising a gate electrode connected to a second gate power;

a third transistor connected between the first gate line and a 11th clock line, and comprising a gate electrode connected to the first control node; and a first capacitor connected between the first gate line and the first control node, wherein the 11th clock line is configured to receive the first clock signal, and wherein the 12th clock line is configured to receive a first inverting clock signal having a phase delayed by half a period from the first clock signal.

18. The display device according to claim 17, wherein the first stage comprises:

a fourth transistor connected between a first gate power and the first gate line, and comprising a gate electrode connected to a second control node;

a fifth transistor connected between the second control node and the 12th clock line, and comprising a gate electrode connected to the third control node;

a sixth transistor connected between the second control node and the second gate power, and comprising a gate electrode connected to the 12th clock line; and a second capacitor connected between the first gate power and the second control node.

19. The display device according to claim 18, wherein each of the first to sixth transistors comprises a silicon semiconductor.

20. An electronic device, comprising:

a processor configured to provide image data; and a display device configured to display an image based on the image data, wherein the display device comprises:

a display panel comprising a pixel connected to a first gate line, a second gate line, a third gate line, and a light emission control line;

a gate driver configured to provide a first gate signal to the first gate line in response to a first clock signal, a second gate signal to the second gate line in response to a second clock signal, a third gate signal to the third gate line in response to a third clock signal, and an emission control signal to the light emission control line in response to a fourth clock signal; and a timing controller configured to provide the first to fourth clock signals to the gate driver, wherein the gate driver is configured to:

output the first gate signal, the second gate signal, the third gate signal, and the emission control signal, each having a pulse, during an active period; and output the emission control signal having a pulse, while maintaining the first and second gate signals at a constant voltage, during a blank period, and wherein the timing controller is configured to:

provide, to the gate driver during the active period, the first to fourth clock signals that toggle between a logic high level and a logic low level; and maintain the first and second clock signals during the blank period.

* * * * *